(12) United States Patent
Sweers et al.

(10) Patent No.: US 11,555,693 B2
(45) Date of Patent: Jan. 17, 2023

(54) MEASUREMENT OF SURFACE PROFILES USING UNMANNED AERIAL VEHICLES

(71) Applicant: The Boeing Company, Chicago, IL (US)

(72) Inventors: Gregory J. Sweers, Renton, WA (US); Gary E. Georgeson, Tacoma, WA (US)

(73) Assignee: The Boeing Company, Chicago, IL (US)

( * ) Notice: Subject to any disclaimer, the term of this patent is extended or adjusted under 35 U.S.C. 154(b) by 308 days.

(21) Appl. No.: 15/930,261

(22) Filed: May 12, 2020

(65) Prior Publication Data

US 2021/0356255 A1    Nov. 18, 2021

(51) Int. Cl.
*G01B 11/22* (2006.01)
*G01B 11/30* (2006.01)
(Continued)

(52) U.S. Cl.
CPC ............ *G01B 11/22* (2013.01); *B64C 39/024* (2013.01); *B64D 47/08* (2013.01); *G01B 5/18* (2013.01);
(Continued)

(58) Field of Classification Search
CPC . G01B 11/22; G01B 5/18; G01B 5/28; G01B 11/303; B64C 39/024;
(Continued)

(56) References Cited

U.S. PATENT DOCUMENTS 4,413,905 A    11/1983    Holzapfel
5,135,356 A    8/1992    Shepherd
(Continued)

FOREIGN PATENT DOCUMENTS

CN    101140227 A  *  3/2008
CN    103477185 A  *  12/2013    ............. G01B 21/04
(Continued)

OTHER PUBLICATIONS

Verette, "Development and Evaluation of Methods of Plane Stress Fracture Analysis", 1973, Northrop Corporation, 1-31 (Year: 1973).*
(Continued)

*Primary Examiner* — Peter D Nolan
*Assistant Examiner* — Kenneth M Dunne
(74) *Attorney, Agent, or Firm* — Ostrager Chong Flaherty & Broitman P.C.

(57) ABSTRACT

Systems, methods, and apparatus for acquiring surface profile information (e.g., depths at multiple points) from limited-access structures and objects using an autonomous or remotely operated flying platform (such as an unmanned aerial vehicle). The systems proposed herein use a profilometer to measure the profile of an area on a surface where visual inspection has indicated that the surface has a potential anomaly. After the system has gathered data representing the surface profile in the area containing the potential anomaly, a determination may be made whether the collected image data indicates that the structure or object should be repaired or may be used as is.

20 Claims, 23 Drawing Sheets

(51) Int. Cl.
*G01B 5/18* (2006.01)
*G01B 5/28* (2006.01)
*B64C 39/02* (2006.01)
*B64D 47/08* (2006.01)

(52) U.S. Cl.
CPC .............. *G01B 5/28* (2013.01); *G01B 11/303* (2013.01); *B64C 2201/027* (2013.01); *B64C 2201/042* (2013.01); *B64C 2201/108* (2013.01); *B64C 2201/123* (2013.01); *B64C 2201/127* (2013.01)

(58) Field of Classification Search
CPC ........ B64C 2201/027; B64C 2201/042; B64C 2201/108; B64C 2201/123; B64C 2201/127; B64D 47/08
See application file for complete search history.

(56) References Cited

U.S. PATENT DOCUMENTS

| | | | |
|---|---|---|---|
| 5,349,440 A | 9/1994 | DeGroot | |
| 5,904,165 A | 5/1999 | McLean et al. | |
| 7,228,642 B2 | 6/2007 | Enderle et al. | |
| 7,398,698 B2 | 7/2008 | Griess et al. | |
| 7,512,457 B2 | 3/2009 | Wood et al. | |
| 7,594,339 B2 | 9/2009 | Seitz et al. | |
| 7,617,730 B2 | 11/2009 | Georgeson et al. | |
| 7,643,893 B2 | 1/2010 | Troy et al. | |
| 7,813,888 B2 | 10/2010 | Vian et al. | |
| 7,859,655 B2 | 12/2010 | Troy et al. | |
| 7,950,164 B2 | 5/2011 | Nakayama et al. | |
| 8,044,991 B2 | 10/2011 | Lea et al. | |
| 8,060,270 B2 | 11/2011 | Vian et al. | |
| 8,214,098 B2 | 7/2012 | Murray et al. | |
| 8,255,170 B2 | 8/2012 | Kollgaard et al. | |
| 8,276,435 B2 | 10/2012 | Kanematsu et al. | |
| 8,467,978 B2 | 6/2013 | Huffman et al. | |
| 8,691,383 B2 | 4/2014 | Georgeson et al. | |
| 8,738,226 B2 | 5/2014 | Troy et al. | |
| 8,744,133 B1 | 6/2014 | Troy et al. | |
| 9,156,321 B2 | 10/2015 | Troy et al. | |
| 9,221,506 B1 | 12/2015 | Georgeson et al. | |
| 9,285,296 B2 | 3/2016 | Georgeson et al. | |
| 9,371,133 B2 | 6/2016 | Mays | |
| 9,479,658 B2 | 10/2016 | Troy et al. | |
| 9,513,635 B1 | 12/2016 | Bethke et al. | |
| 9,546,865 B1 | 1/2017 | Tat et al. | |
| 9,731,818 B2 | 8/2017 | Dekel et al. | |
| 9,840,339 B1 | 12/2017 | O'Brien et al. | |
| 9,869,537 B2 | 1/2018 | Hidaka et al. | |
| 9,959,608 B1* | 5/2018 | Freeman | G06Q 30/0278 |
| 10,186,348 B2 | 1/2019 | Davis et al. | |
| 10,252,800 B1* | 4/2019 | Dorsey | G01N 29/28 |
| 10,488,171 B2 | 11/2019 | Ruck et al. | |
| 2005/0145033 A1* | 7/2005 | Bossi | G01N 29/225 73/620 |
| 2010/0268409 A1 | 10/2010 | Vian et al. | |
| 2012/0060609 A1* | 3/2012 | Fukutomi | G01N 29/265 73/592 |
| 2012/0136630 A1 | 5/2012 | Murphy et al. | |
| 2012/0262708 A1 | 10/2012 | Connolly | |
| 2013/0024067 A1* | 1/2013 | Troy | B64F 5/30 180/69.6 |
| 2013/0261876 A1* | 10/2013 | Froom | B64F 5/00 901/44 |
| 2015/0226369 A1* | 8/2015 | Troy | F16M 11/42 901/1 |
| 2015/0377839 A1* | 12/2015 | Jack | G01N 29/46 702/33 |
| 2016/0096637 A1* | 4/2016 | Troy | G01N 29/265 180/14.1 |
| 2016/0349746 A1 | 12/2016 | Grau | |
| 2017/0113799 A1* | 4/2017 | Kovac | F03D 1/0675 |
| 2017/0269592 A1* | 9/2017 | Weaver | G01N 21/952 |
| 2018/0067484 A1* | 3/2018 | Troy | H04N 7/185 |
| 2018/0120196 A1* | 5/2018 | Georgeson | B64C 39/024 |
| 2018/0129211 A1* | 5/2018 | Vidyadharan | B64C 39/024 |
| 2018/0361571 A1* | 12/2018 | Georgeson | B25J 5/007 |
| 2019/0049574 A1* | 2/2019 | Simula | B60R 1/00 |
| 2019/0094149 A1* | 3/2019 | Troy | G01M 5/0075 |
| 2019/0127052 A1* | 5/2019 | Chen | B64C 37/00 |
| 2020/0166938 A1* | 5/2020 | Hafenrichter | B64C 27/20 |
| 2020/0207488 A1* | 7/2020 | Troy | G05D 1/0094 |
| 2020/0377233 A1* | 12/2020 | Harvey | B64F 5/60 |
| 2022/0041281 A1* | 2/2022 | Amsili | G05D 1/101 |

FOREIGN PATENT DOCUMENTS

| | | | | |
|---|---|---|---|---|
| CN | 106864797 A | * | 6/2017 | |
| DE | 102016214655 A1 | * | 2/2018 | .......... B64C 39/024 |
| JP | 2017124689 A | * | 7/2017 | |
| JP | 2017124691 A | * | 7/2017 | |
| JP | 2018179819 A | * | 11/2018 | |
| JP | 2019084868 A | * | 6/2019 | ............ G06K 15/10 |
| KR | 20170051271 A | * | 5/2017 | |
| WO | WO 2002039057 A1 | * | 3/2004 | |
| WO | WO-2012013878 A1 | * | 2/2012 | .......... B64C 39/024 |
| WO | WO-2019017430 A1 | * | 1/2019 | ............ B66C 13/00 |

OTHER PUBLICATIONS

Tsai, "An Integrated Vision Touch-Probe System for Dimensional Inspection Tasks", 1998, National Institute of Standards and Technology, Whole Document (Year: 1998).*

Nikolic et al., "A UAV System for Inspection of Industrial Facilities," Aerospace Conference, 2013 IEEE, Mar. 2-9, 2013.

* cited by examiner

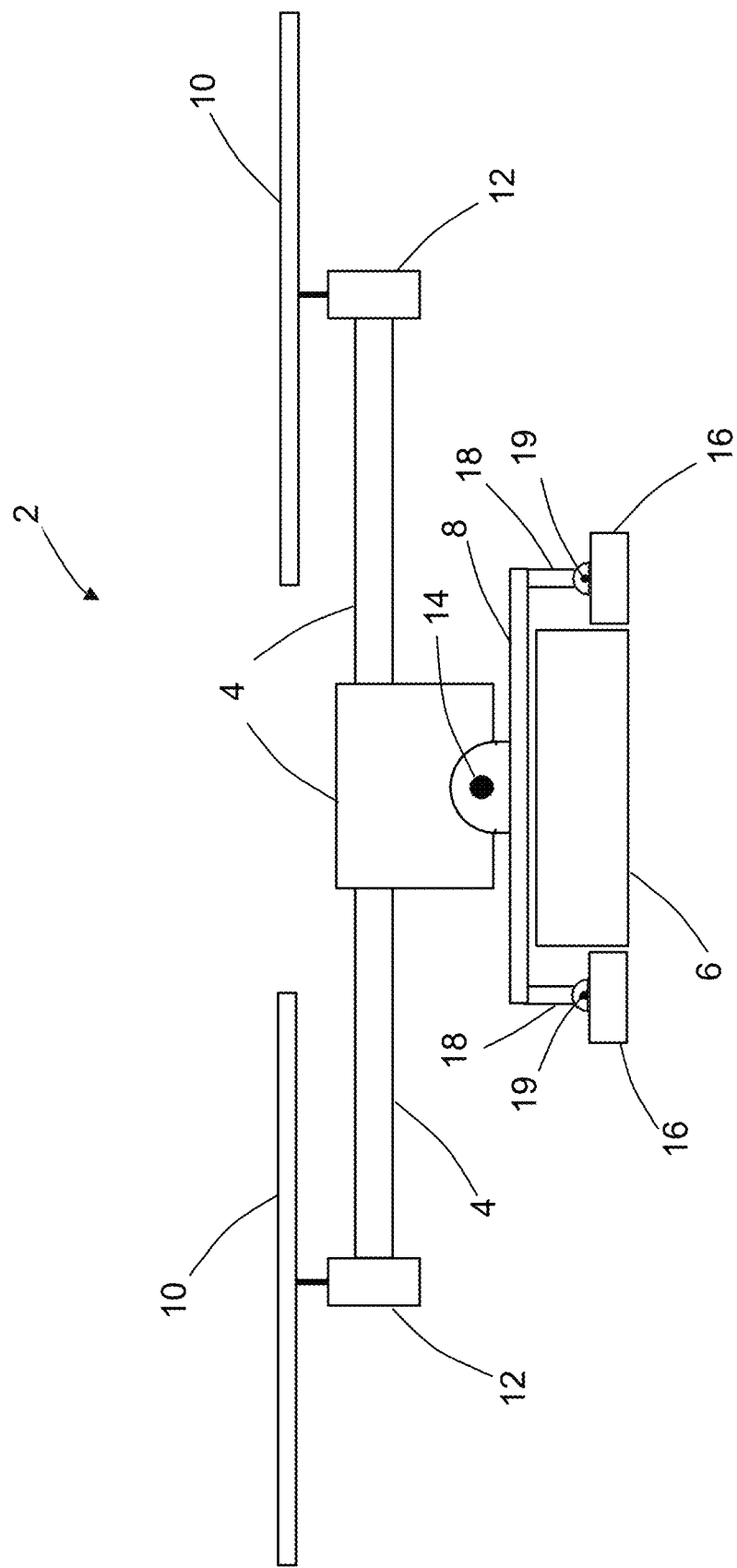

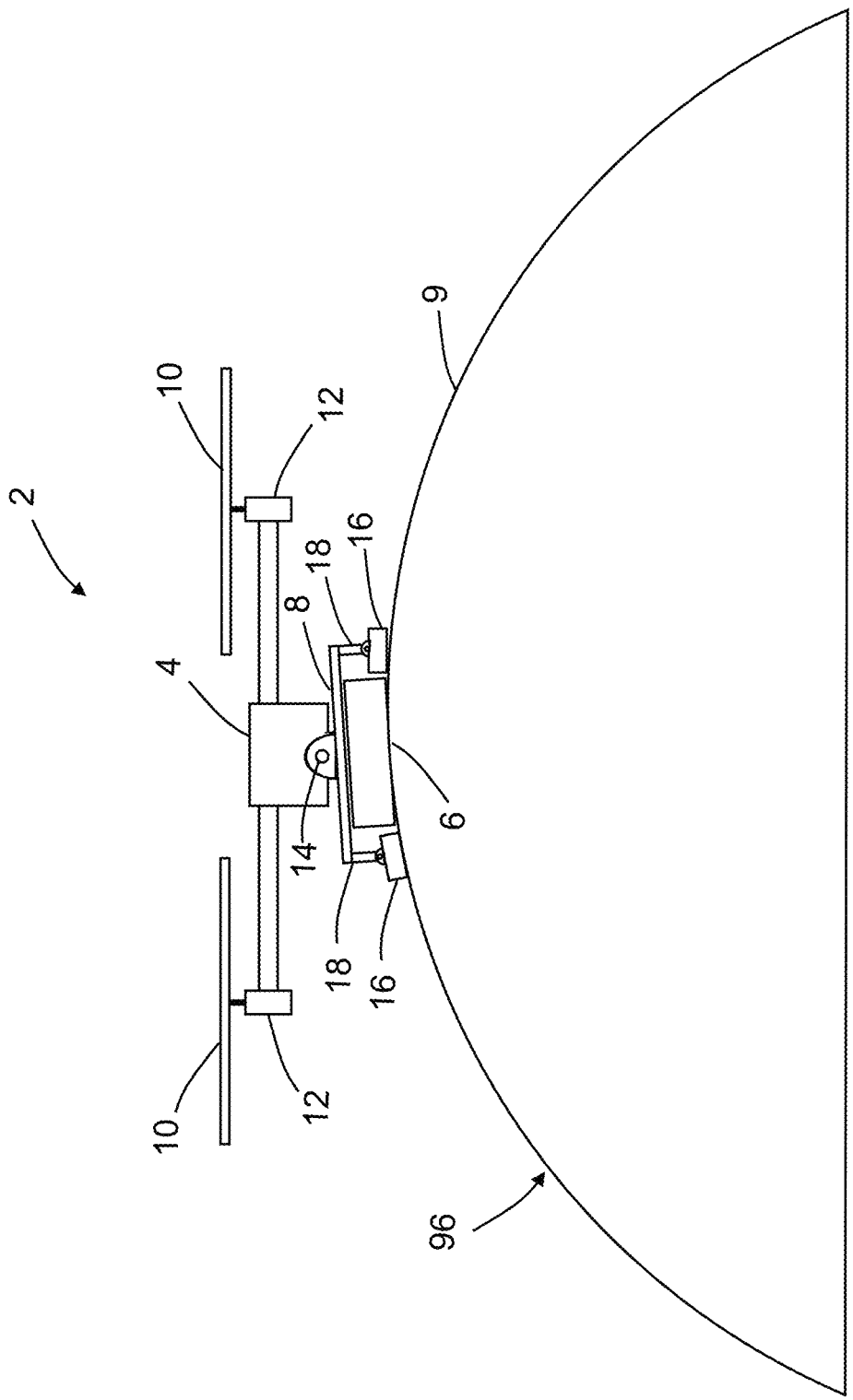

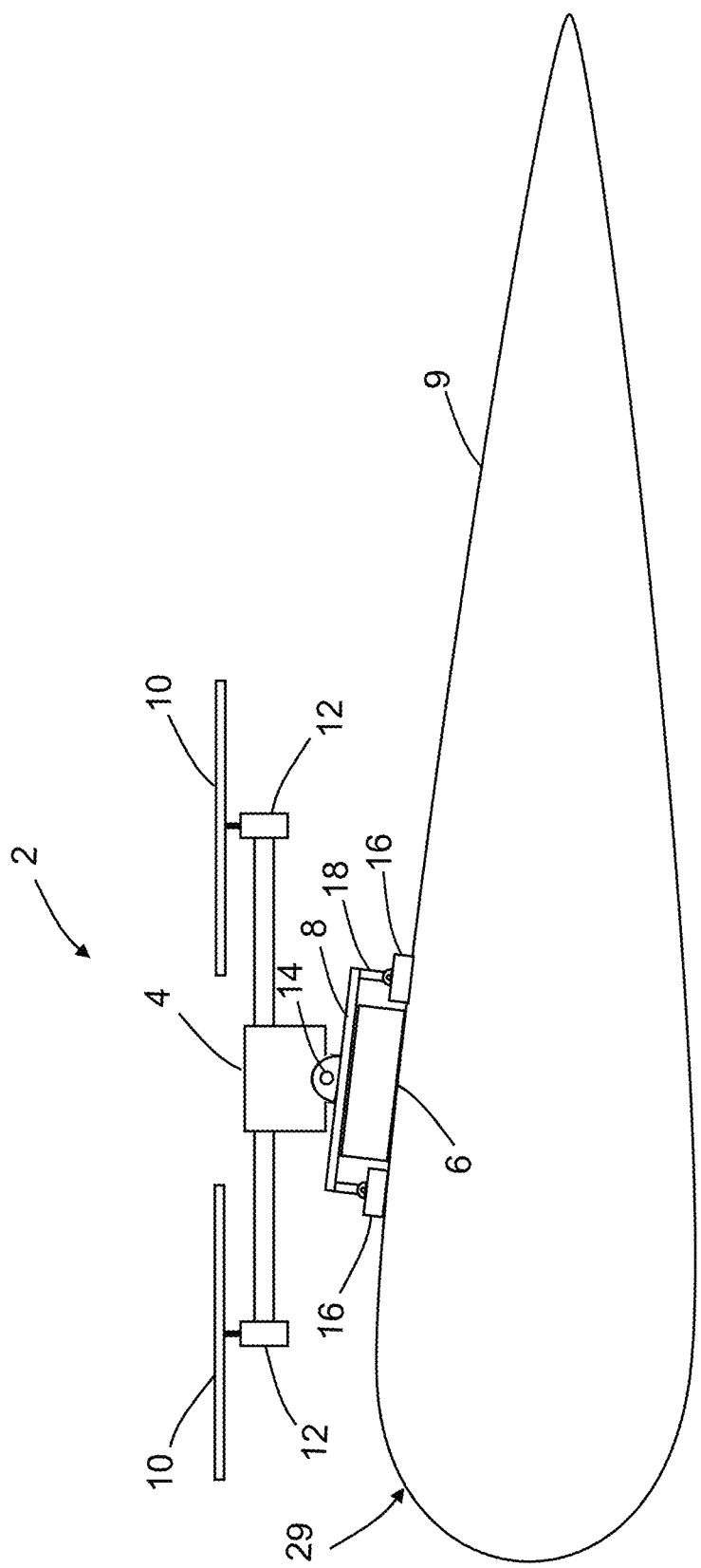

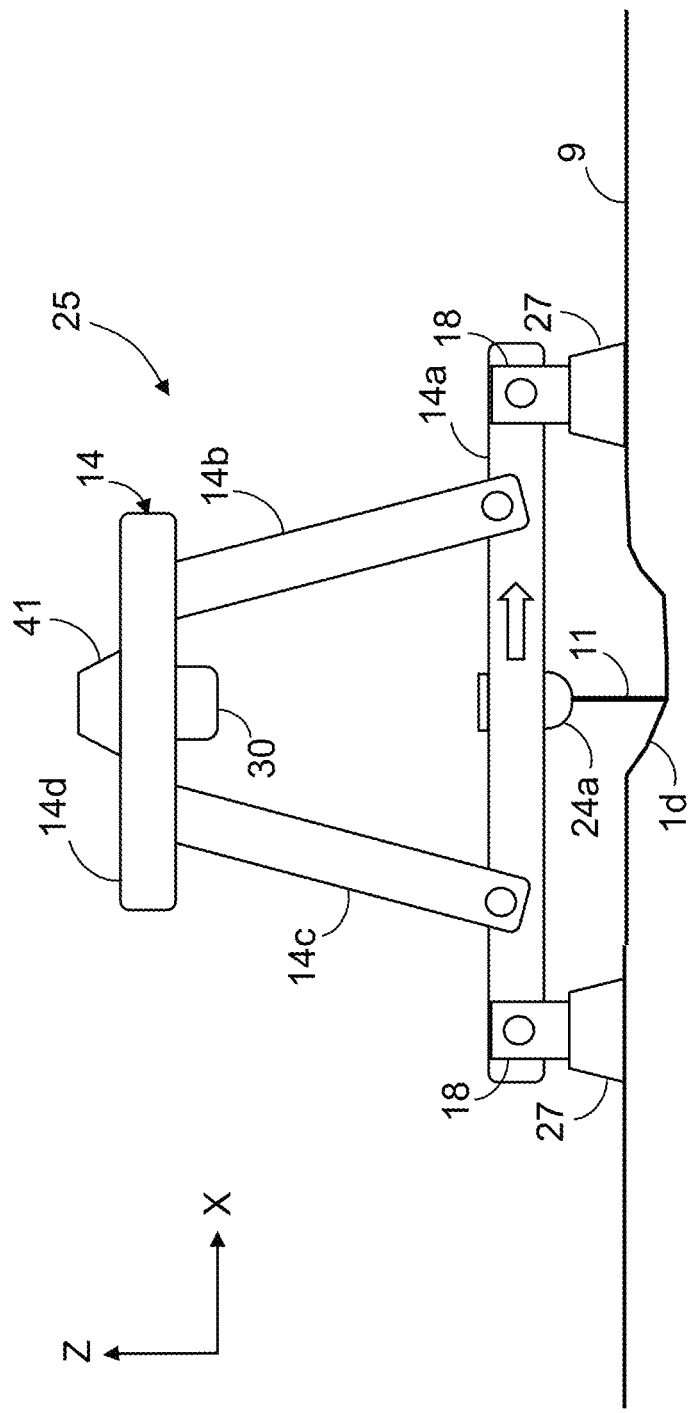

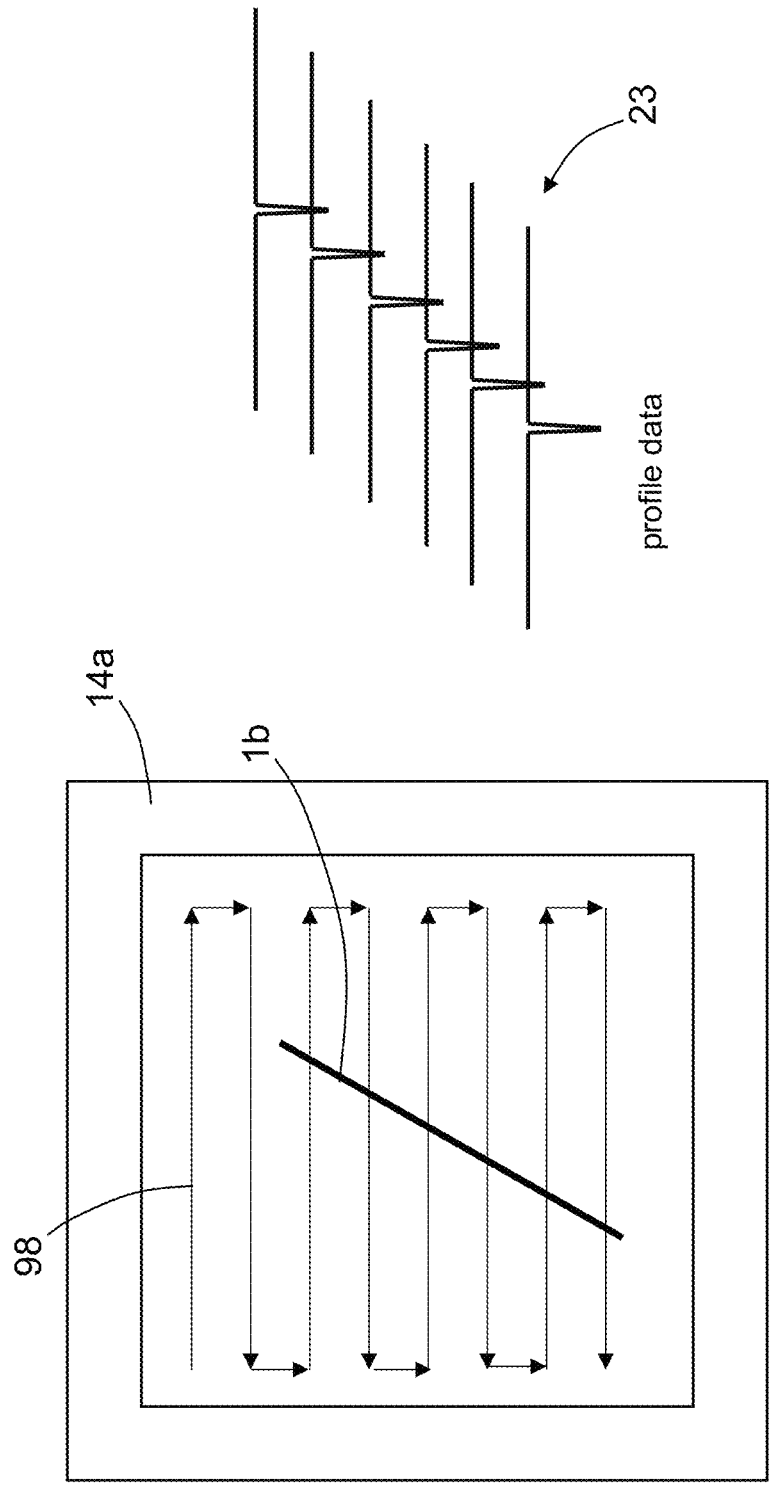

MEASUREMENT OF SURFACE PROFILES USING UNMANNED AERIAL VEHICLES

BACKGROUND

This disclosure generally relates to inspection and repair of structures using unmanned aerial vehicles (UAVs). In particular, this disclosure relates to the use of a UAV for in-service inspection of structures and objects which are difficult for maintenance personnel to access (hereinafter "limited-access structures and objects").

In-service human-based inspection of large standing structures and various types of large moving objects can be time consuming, expensive and difficult for an individual to perform. Examples of large structures and objects that pose significant inspection challenges include wind turbine blades, aircraft fuselages and wings, rockets and satellites, storage tanks, dams, levees, power plants, power lines or electrical power grids, water treatment facilities; oil refineries, chemical processing plants, high-rise buildings, and infrastructure associated with electric trains and monorail support structures.

More specifically, materials and structures employed in the aerospace industry and elsewhere may periodically require inspection for the purpose of detecting in-service damage or structural inconsistencies (hereinafter "anomalies"). Rapid inspection and repair of aircraft are important for military and commercial applications in order to decrease down time. For example, the use of composite structures is increasingly common on commercial aircraft. Composites may be damaged in the course of service. Examples of such in-service damage include lightning strike, impact damage due to hail, runway debris (object damage), or collisions with ground support vehicles.

The aerospace and other industries are developing apparatus and methods for autonomous or remotely controlled UAV-enabled visual inspection of limited-access structures and objects. In particular, there is a need for automated apparatus for rapid inspection of large composite structures (e.g., aircraft and wind turbine blades) during a planned structural maintenance check or after an event that may have created damage (e.g., lightning strike, physical impact, bird strike). When assessing the image data gathered during a UAV-enabled visual inspection of a surface, it is helpful to discriminate between different types of surface anomalies—some of which require repair and others which do not.

Currently, an inspector who is physically present at the inspection site can use a finger nail scratch test to determine if an anomaly indication represents an area where material has been removed. But if the visual inspection that produced the anomaly indication is performed by an autonomous or remotely controlled apparatus (such as a tool-equipped UAV), this scratch test is not necessary, thereby eliminating the need for an inspector to rise up on a lift or onto the aircraft to physically check the anomaly. The drawbacks to positioning an inspector or mechanic at a limited-access inspection site include added cost, time, and labor, and potential ergonomic issues and exposure to potentially hazardous conditions associated with inspections of large limited-access structures and objects. In addition, the depth of a scratch may be difficult to quantify by a manual procedure performed by an inspector in a precarious elevated position. Without accurate quantification of the extent of the anomaly, determining whether to repair the structure or allow continued restricted operation may be difficult.

SUMMARY

The subject matter disclosed in some detail below is directed to systems, methods, and apparatus for acquiring surface profile information (e.g., depths at multiple points) from limited-access structures or objects using an autonomous or remotely operated flying platform (such as a UAV). The systems proposed herein use a profilometer to measure the profile of an area on a surface where visual or another inspection technique has indicated that the surface has a potential anomaly (hereinafter "anomaly indication"). After the system has gathered data representing the surface profile in the area containing the potential anomaly, a determination may be made whether the collected image data indicates that the structure or object should be repaired or may be used as is.

In accordance with one method of measuring the surface profile, an image including a visual indication of an anomaly on a surface is acquired using a UAV equipped with a camera, a remote camera (on the ground or attached to the target structure or a neighboring structure), human vision (e.g., with the aid of binoculars or a telescope), or other method. The depth and general morphology (e.g., topography or geometry) of the area containing the indicated anomaly should be determined so that proper disposition can be done.

In accordance with one embodiment, the same UAV or a different UAV is equipped with a profilometer that enables autonomous or remotely controlled checking of anomaly indications to determine what further actions should be taken. Discrimination of linear anomaly indications, e.g., between a surface mark and a scratch that has removed one or more external coatings, is helpful. The process utilizes a UAV to make this determination without the need for direct human access to the portion of the surface that gave rise to the anomaly indication of an anomaly. As used herein, the term "profilometer" means a system or apparatus configured to measure the distance of one or more points on a surface relative to a reference plane. Optionally, the profilometer may be configured to generate a mapping representing the profile of an area on the surface and store that mapping in a non-transitory tangible computer-readable storage medium.

In accordance with one embodiment, a UAV is configured to fly a surface profile measurement module (also referred to herein as a "profilometer module") to the area of interest. In one proposed implementation, the UAV is equipped with an arm that carries the module. This may be the same UAV that was used to visually detect the anomaly or a separate one. Guidance to the site of the anomaly is provided using a camera or other positional feedback (such as an offboard local positioning system). The surface profile measurement module temporarily attaches to the structure using vacuum, electrostatics, electro-magnetics (for ferromagnetic structure), or removable adhesive. Once the module is attached, the module may remain attached to the UAV (while the UAV hovers or turns off its rotors) or be temporarily disengaged (decoupled) from the UAV. The profile of the surface in the area including the anomaly is then automatically scanned.

In accordance with one proposed configuration, the surface profile measurement module includes a frame that supports a camera for visual inspection of the surface and/or assisting in centering of the module over the anomaly. In alternative embodiments, the camera may be coupled to the UAV frame instead of the module frame. Laser-based measurement (e.g., a laser profilometer) or a contact displacement sensor (e.g., a digital pin depth gauge) provides the depth measurement. The laser profilometer can be configured to perform single point, linear, or three-dimensional (3-D) measurement, using appropriate scanning for the particular type. The digital pin (single point) depth gauge has a slender tip to allow for the depth measurement of narrow cracks or corrosion pits. A solenoid or Z-axis drive allows the pin to be picked up between lateral steps across an anomaly. (This is not the case for the laser-based methods.)

Laser profile measurement (scanned single spot, scanned line, or 3-D) or a digital pin depth gauge provides the depth measurement relative to the area surrounding the anomaly. A mapping of profile data over an area may be obtained in this way. Maximum depth or the area of the anomaly may be of interest, depending upon the inspection or repair specifications.

Although various embodiments of methods and apparatus for UAV-enabled automated measurement of the profile of a surface of a limited-access structure are described in some detail later herein, one or more of those embodiments may be characterized by one or more of the following aspects.

One aspect of the subject matter disclosed in detail below is an apparatus comprising: a first frame; a plurality of rotor motors mounted to the first frame; a plurality of rotors operatively coupled to respective rotor motors of the plurality of rotor motors; a second frame coupled to the first frame; a plurality of attachment feet coupled to the second frame; a scanner movably coupled to the second frame; a depth measurement device supported by the scanner and configured to measure a depth of a target point on a surface of a structure or object when the plurality of attachment feet are in contact with the surface; and a computer programmed to control the scanner and the depth measurement device so that the depth measurement device acquires profile data from the surface at multiple positions along a scan path. For examples, the depth measurement device may be a contact displacement sensor or a laser range meter. Optionally, the second frame is releasable from the first frame when a module release actuator is activated.

In accordance with one embodiment of the apparatus described in the immediately preceding paragraph, the scanner comprises: a first traveling bridge slidably coupled to the second frame for translation in an X direction and having a first longitudinal slot; and a second traveling bridge slidably coupled to the second frame for translation in a Y direction perpendicular to the X direction and having a second longitudinal slot that crosses the first longitudinal slot. The depth measurement device (e.g., contact displacement sensor or laser range meter) is supported at a crossing of the first and second longitudinal slots. In accordance with another embodiment of the apparatus, the scanner comprises: a traveling bridge slidably coupled to the second frame for translation in an X direction and comprising a guide rail that is perpendicular to the X direction; and a carriage slidably coupled to the guide rail for translation along the guide rail. In this case, the depth measurement device (e.g., contact displacement sensor or laser range meter) is carried by the carriage.

Another aspect of the subject matter disclosed in detail below is a depth measurement apparatus comprising: a frame; a plurality of attachment feet coupled to the frame; a scanner comprising a first traveling bridge slidably coupled to the frame for translation in an X direction and having a first longitudinal slot, and a second traveling bridge slidably coupled to the frame for translation in a Y direction perpendicular to the X direction and having a second longitudinal slot that crosses the first longitudinal slot, and a depth measurement device fixedly coupled to the scanner, wherein the depth measurement device is supported at a crossing of the first and second longitudinal slots and is configured to measure a depth of a point on a surface of a structure or object when the plurality of attachment feet are in contact with the surface. Optionally, the apparatus further comprises a computer that is programmed to control the scanner and the depth measurement device so that the depth measurement device acquires profile data from the surface at multiple positions along a two-dimensional scan path.

A further aspect of the subject matter disclosed in detail below is an apparatus comprising: a plurality of rotor motors; a plurality of rotors operatively coupled to respective rotor motors of the plurality of rotor motors; a plurality of attachment feet; and a profilometer coupled to the frame and configured to measure a profile of a surface of a structure or object when the plurality of attachment feet are in contact with the surface. In accordance with some embodiments, the profilometer comprises: a first traveling bridge slidably coupled to the frame for translation in an X direction and having a first longitudinal slot; a second traveling bridge slidably coupled to the frame for translation in a Y direction perpendicular to the X direction and having a second longitudinal slot that crosses the first longitudinal slot; and a depth measurement device (e.g., a contact displacement sensor or a laser range meter) supported at a crossing of the first and second longitudinal slots. In accordance with another embodiment, the scanner comprises a traveling bridge slidably coupled to the frame for translation in an X direction; and the distance measurement device comprises a line laser profiler mounted to the traveling bridge. In accordance with a further embodiment, the profilometer comprises a three-dimensional laser scanner. In accordance with some embodiments, the vehicle is a UAV.

Yet another aspect of the subject matter disclosed in detail below is a method for measuring a profile of a surface of a structure or object using a UAV, the method comprising: (a) coupling a profilometer to an unmanned aerial vehicle; (b) flying the unmanned aerial vehicle to a location where the profilometer is within measurement range of an area on the surface of the structure or object; (c) acquiring surface profile data from the area on the surface using the profilometer; (d) processing the surface profile data to quantify a dimension of an anomaly in the area on the surface; (e) determining that the quantified dimension is greater than a "use as is" threshold; and (f) repairing the structure or object subsequent to step (e). The profilometer may remain coupled to the UAV during scanning of the surface or may be de-coupled from the UAV and adhered to the surface prior to scanning.

Other aspects of methods and apparatus for UAV-enabled automated measurement of surface profiles on limited-access structures or objects are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

FIG. 2 is a diagram representing a side view of a payload-carrying UAV in accordance with one embodiment.

FIG. 2A is a diagram representing a side view of the payload-carrying UAV depicted in FIG. 2 after landing on a structure having a rounded surface, such as an aircraft fuselage or a storage tank.

FIG. 2B is a diagram representing a side view of the payload-carrying UAV depicted in FIG. 2 after landing on an airfoil-shaped body, such as an aircraft wing or a wind turbine blade.

FIG. 4A is a diagram representing a side view of a profilometer module including a contact displacement sensor in accordance with one embodiment, which profilometer module may be a payload carried by a UAV of one of the types depicted in FIG. 2 or FIG. 3A or a type having a different design.

FIG. 6A is a diagram showing a serpentine scan path that crosses a line-shaped anomaly in a surface. The controller for the electro-mechanical 2-D scanner may be configured such that the point-type profilometer held by the 2-D scanner shown in FIG. 6 follows a serpentine path that crosses the anomaly at multiple points.

FIG. 6B is a diagram showing successive signals representing profile data acquired as the point-type profilometer shown in FIG. 6 intermittently crosses the anomaly shown in FIG. 6A.

Reference will hereinafter be made to the drawings in which similar elements in different drawings bear the same reference numerals.

DETAILED DESCRIPTION

Figure 1A:
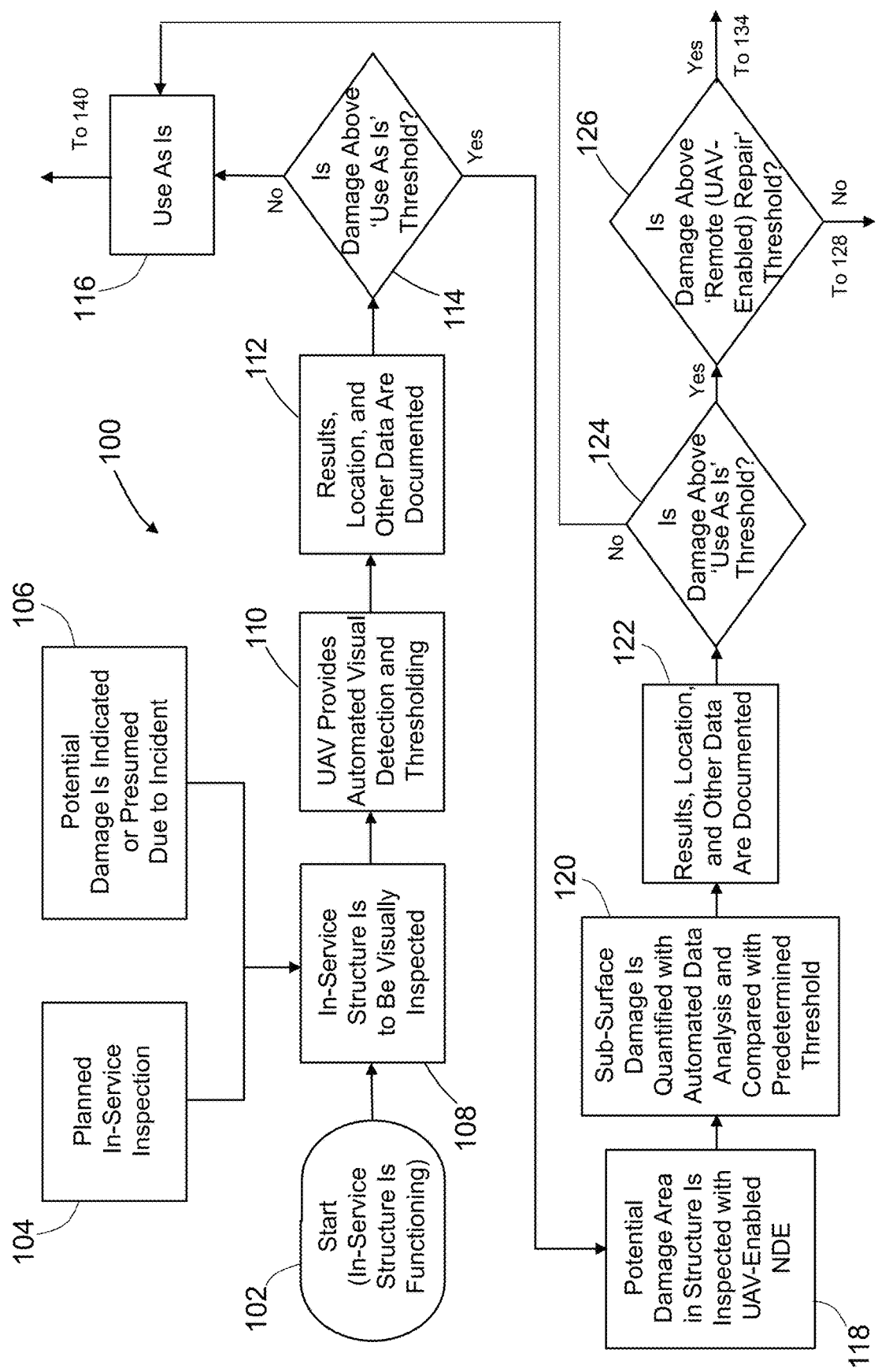
FIGS. 1A and 1B form a flowchart identifying steps of a method for inspecting and repairing an anomalous portion of a large structure using one or more UAVs in accordance with some embodiments.

For the purpose of illustration, methods and apparatus for UAV-enabled automated measurement of surface profiles of limited-access structures and objects will now be described in detail. However, not all features of an actual implementation are described in this specification. A person skilled in the art will appreciate that in the development of any such embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

This disclosure relates to systems and methods that can be used to inspect and repair any number of structures or objects of different shapes and sizes, such as machined forgings, castings, pipes, or composite panels or parts. In addition, an inspected and repaired structure can include various components, such as a substructure for providing additional support to the structure. Further, an inspected and repaired structure or object may be made of any one of a number of materials. For example, an inspected and repaired structure may include a metallic material, such as aluminum, or a composite material, such as graphite-epoxy. In particular, an inspected and repaired structure may be an aircraft component made of composite material.

In accordance with the embodiments disclosed in some detail below, the UAV takes the form of a rotorcraft having multiple rotors. In accordance with the implementation disclosed herein, each rotor has two mutually diametrically opposed rotor blades. However, in alternative implementations, UAVs having rotors with more than two rotor blades may be used. As used herein, the term "rotor" refers to a rotating device that includes a rotor mast, a rotor hub mounted to one end of the rotor mast, and two or more rotor blades extending radially outward from the rotor hub. In the embodiments disclosed herein, the rotor mast is mechanically coupled to an output shaft of a drive motor, referred to hereinafter as a "rotor motor". The rotor motor drives rotation of the rotor. As used herein, the term "rotor system" means a combination of components, including at least a plurality of rotors and a controller configured to control rotor rotation rate to generate sufficient aerodynamic lift force to support the weight of the UAV and sufficient thrust to counteract aerodynamic drag in forward flight. The UAVs disclosed herein include a controller which preferably takes the form of a plurality of rotor motor controllers that communicate with an on-board computer configured to coordinate the respective rotations of the rotors. The controller is configured (e.g., programmed) to control the rotors to cause the UAV to fly along a flight path to a location where the UAV (or a module carried by the UAV) is in proximity to or in contact with an area on the surface of a structure to be inspected and repaired. (As used herein, the term "location" comprises position in a three-dimensional coordinate system and orientation relative to that coordinate system.)

Systems and methods for acquiring surface profile information (e.g., depths at multiple points) from limited-access structures and objects using an autonomous or remotely operated flying platform (such as a UAV) are described in detail below. The embodiments disclosed herein use a profilometer to measure the profile of an area after visual inspection of the surface has indicated the presence of an anomaly. After the system has gathered data representing the surface profile in the area containing the indicated anomaly, a determination may be made whether the collected image data indicates that the structure should be repaired or may be used as is. This surface profile measurement technology may be used to perform a method for inspecting and repairing an anomalous portion of a limited-access structure or object using one or more UAVs.

Figure 1B:
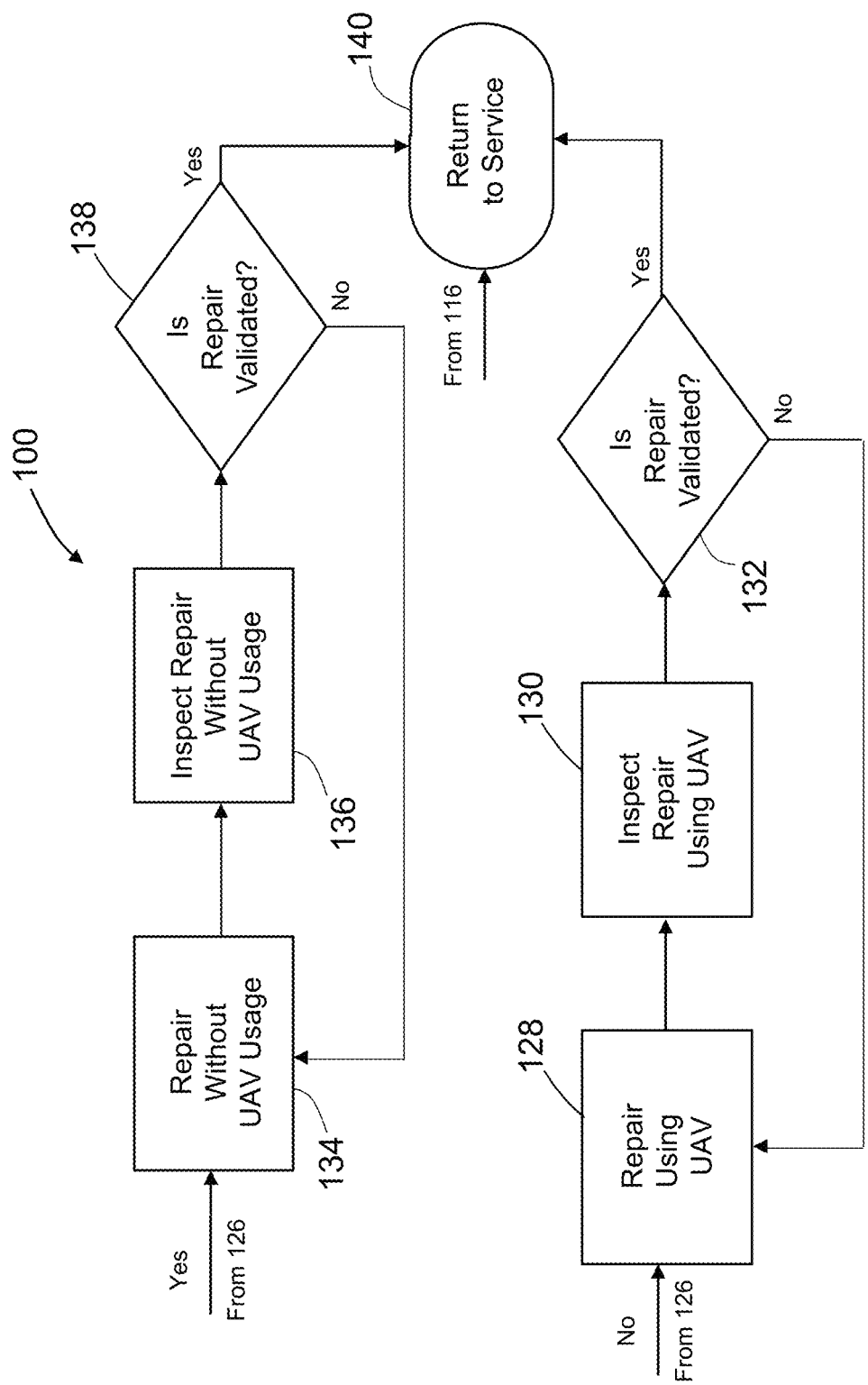

FIGS. 1A and 1B form a flowchart identifying steps of a method 100 for inspecting and repairing an anomalous portion of a limited-access structure that is in service using one or more UAVs. As will be explained in more detail below, a computer on-board the UAV may be configured to determine whether acquired data indicates damage greater (above) or less (below) than a particular threshold value. As used herein, a "use as is" threshold means a threshold which has been specified to demarcate between structure that does not require a repair (e.g., if the indicated damage is less than or below the "use as is" threshold) and structure that potentially should be repaired (e.g., if the indicated damage is greater than or above the "use as is" threshold). As used herein, a "remote repair" threshold means a threshold which has been specified to demarcate between structure that calls for a repair that could be performed by a UAV (e.g., if the indicated damage is less than or below the "remote repair" threshold) and structure that requires a repair not performed by a UAV (e.g., if the indicated damage is greater than or above the "remote repair" threshold).

Referring to FIG. 1A, at the start 102 of the method 100, the in-service structure is functioning, but either the scheduled time for a planned in-service inspection has arrived (step 104) or potential damage to the in-service structure is indicated or presumed due to an incident (step 106). For example, an object impact event has been detected or suspected.

The overall inspection and repair process is initiated when a maintenance operations center dispatches a UAV equipped with a camera to perform a visual inspection of the in-service structure (step 108). The dispatched UAV flies to the vicinity of the possible impact area (hereinafter "area of interest"), uses the camera to acquire images of the area of interest, and then compares the acquired image data to a first "use as is" threshold (step 110). The results of the visual inspection and thresholding, the location of the imaged area and other data are then recorded in a non-transitory tangible computer-readable storage medium on-board the camera-equipped UAV (step 112). A computer on-board the camera-equipped UAV then makes a determination whether the damage indicated by the image data is above the first "use as is" threshold or not (step 114). In the alternative, if the camera-equipped UAV is not also equipped with an NDI sensor unit, then the camera-equipped UAV wirelessly transmits data representing the results of the visual inspection and thresholding, data representing the location of the imaged area and other data to the maintenance operations center for evaluation.

On the one hand, if a determination is made in step 114 that the damage indicated by the image data is not above the first "use as is" threshold, then the structure is used as is (step 116) and returned to service (step 140 in FIG. 1B). On the other hand, if a determination is made in step 114 that the damage indicated by the image data is above the first "use as is" threshold, then a UAV equipped with an NDI sensor unit (which may be the same UAV as the camera-equipped UAV or a separate UAV) is flown to a location where the NDI sensor unit is within an measurement range of the potentially anomalous area (hereinafter "potential anomalous area") on the surface of the structure. For example, the NDI sensor-equipped UAV may land on the surface of the structure and then use the NDI sensor unit to acquire NDI sensor data in the potential anomalous area (step 118). The computer on-board the NDI sensor-equipped UAV then performs an analysis of the NDI sensor data that quantifies the sub-surface damage and compares the resulting quantitative data to various predetermined thresholds (step 120). The results of the analysis and thresholding, the location of the sensed area and other data are then recorded in a non-transitory tangible computer-readable storage medium on-board the NDI sensor-equipped UAV (step 122). A computer on-board the NDI sensor-equipped UAV then makes a determination whether the damage indicated by the NDI sensor data is above a second "use as is" threshold or not (step 124). In the alternative, if the NDI sensor-equipped UAV is not also equipped with a repair tool, then the NDI sensor-equipped UAV wirelessly transmits data representing the results of the analysis and thresholding, data representing the location of the sensed area and other data to the maintenance operations center for evaluation.

On the one hand, if a determination is made in step 124 that the damage indicated by the NDI sensor data is not above the second "use as is" threshold, then the structure is used as is (step 116) and returned to service (step 140 in FIG. 1B). On the other hand, if a determination is made in step 124 that the damage indicated by the NDI sensor data is above the second "use as is" threshold, then the computer on-board the NDI sensor-equipped UAV makes a determination whether the damage indicated by the NDI sensor data is below a "remote repair" threshold or not (step 126). In the alternative, if the NDI sensor-equipped UAV is not also equipped with a repair tool, then the maintenance operations center has a computer programmed to make the determination in step 126.

Depending on the outcome of step 122 (shown in FIG. 1A), the process may proceed in accordance with either a remote or UAV-enabled repair procedure or a manual repair procedure that requires human intervention, the steps of both of which are identified in FIG. 1B. On the one hand, if a determination is made in step 122 that the damage indicated by the NDI sensor data is not above the "remote repair" threshold, then a UAV equipped with a repair tool (which may be the same UAV as the camera-equipped UAV or a separate UAV) is flown to a location where the repair tool is placed in contact with the structure in the area to be repaired. While the repair tool-equipped UAV is stationary, the anomalous area is repaired using the repair tool (step 128 in FIG. 1B). On the other hand, if a determination is made in step 122 that the damage indicated by the NDI sensor data is above the "remote repair" threshold, then the NDI sensor-equipped UAV wirelessly transmits a message notifying the maintenance operations center that the structure requires direct human access for a more in-depth or complicated repair of the damaged structure (step 134 in FIG. 1B). In the latter case, a UAV-enabled repair is not made.

Still referring to FIG. 1B, following completion of the UAV-enabled repair in step 128, a UAV equipped with either a camera or an NDI sensor unit (which may be the same UAV as the camera-equipped or NDI sensor-equipped UAV described above or a separate UAV) is used to perform an inspection to verify that the repaired structure is good for service (step 130). The results of the inspection are stored in a non-transitory tangible computer-readable storage medium on-board the inspecting UAV and the UAV wirelessly transmits a message to the maintenance operations center reporting completion of the repair. A determination is then made whether the repair is validated or not (step 132). On the one hand, if the repair is not validated, then the repair procedure returns to step 128. On the other hand, if the repair is validated, then the repaired structure is returned to service (step 140).

Conversely, following issuance of the notification indicating that a repair by means not including a UAV (e.g., a manual repair) is recommended, the maintenance operations center dispatches appropriately equipped technicians to conduct a repair of the anomalous area on the structure (step 134). Following completion of the repair by means not including a UAV in step 134, a NDI or visual inspection of the repaired portion of the structure is performed, also by means not including a UAV (step 136). A determination is then made whether the repair is validated or not (step 138). On the one hand, if the repair is not validated, then the repair procedure returns to step 134. On the other hand, if the repair is validated, then the repaired structure is returned to service (step 140).

In accordance with the embodiments disclosed herein, the NDI sensor unit is a profilometer configured to acquire profile data in the potential anomalous area (step 118). Various embodiments of apparatus for measuring the profile of a surface on a limited-access structure will now be described in some detail. The tools and tool support devices carried by a UAV will be referred to herein as the "payload". Such a payload may be fixedly or pivotably coupled to the body frame of the UAV or may be fixedly coupled to a payload support frame which is pivotably or releasably coupled to the UAV body frame. The payloads disclosed herein are referred to as "profilometer modules". As used herein, the term "module" refers to an independently operable unit that may be attached to a UAV and comprises an assembly of electronic and mechanical components configured to measure depth at multiple points on a surface.

The UAVs disclosed herein include a controller which preferably takes the form of a plurality of rotor motor controllers that communicate with an onboard computer system configured to coordinate the respective rotations of the rotors. The controller is configured (e.g., programmed) to control the rotors in accordance with flight guidance received from a 3-D localization system that tracks the location of the UAV relative to the target environment. The target destination of the UAV is a location where a plurality of standoff contact elements of the UAV contact the surface of the structure to be measured. Once the standoff contact elements are in contact with the surface of the structure, the controller activates surface attachment devices (e.g., vacuum adherence devices) to maintain the UAV stationary at the location with the standoff contact elements abutting the surface. Then the profilometer module is activated to perform the measurement procedure. Upon completion of the measurement procedure, the UAV releases the surface attachment devices and lifts offs from the surface, again using reorientation and speed changes on a subset of the rotors.

The UAV 2 depicted in FIG. 2 carries a payload 6. In accordance with embodiments described in some detail below, the payload 6 may be a profilometer module that includes a scanner and a profilometer carried by the scanner. After the payload has been placed on the surface of a limited-access structure, the payload 6 may be uncoupled from the UAV 2. The UAV 2 may then takeoff, leaving the payload 6 on the surface to independently perform the automated depth measurement procedure.

As seen in FIG. 2, the UAV 2 includes a UAV body frame 4, a plurality of rotor motors 12 mounted to the UAV body frame 4, and a plurality of rotors 10 respectively operatively coupled to the plurality of rotor motors 12. In addition, the UAV 2 includes a payload support frame 8 pivotably coupled to the UAV body frame 4 by means of a gimbal pivot 14. The payload support frame 8 includes a plurality of (at least three) standoff support members 18. A respective standoff contact foot 16 is coupled to the distal end of each standoff support member 18. In one proposed implementation, the standoff contact feet 16 are made of compliant (e.g., elastomeric) material. The standoff support members 18 and standoff contact feet 16 form a standoff system that maintains the payload 6 in a standoff position relative to the surface being repaired.

In accordance with the embodiment depicted in FIG. 2, the standoff contact feet 16 are pivotably coupled to the distal ends of the standoff support members 18 by means of respective pivots 19. The pivotable coupling enables the standoff contact feet 16 to adjust their orientations so that the feet lie flat on curved surfaces. FIG. 2A shows the payload-carrying UAV 2 after landing on a target object 96 having a surface 9, such as the surface of an aircraft fuselage or the upper surface of a storage tank. FIG. 2B shows the same UAV 2 after landing on a surface 9 of an airfoil-shaped body 29 such as an aircraft wing or a wind turbine blade. In both scenarios, each standoff contact foot 16 is able to reorient to be parallel to a flat or tangent to a surface 9 in the area of abutment.

FIGS. 3A through 3D are diagrams representing respective three-dimensional views of a UAV 2 having a pivotable arm 3 (hereinafter "arm 3") for carrying a payload 6 at successive stages during a process of transporting and placing the payload 6 on a surface 9 of a repairable structure.

The arm 3 is pivotably coupled to the frame 4 of the UAV 2 by means of a pivot 5 which is supported by a pivot support 4a. The pivot support 4a is attached to or integrally formed with frame 4. The payload 6 is coupled to one end of arm 3 by a coupling mechanism 15 (visible in FIG. 3D). A counterweight 7 is coupled to the other end of arm 3. The payload 6 and counterweight 7 have respective known weights. Controlling the arm 3 to align the payload 6 with a portion of the surface 9 involves controlling the arm 3 taking one or more parameters into account. Specifically, controlling the angular position of arm 3 may be based on the arm length, fulcrum point (at pivot 5), counterweight, and payload weight. Controlling the angular position of arm 3 based on these factors may prevent the UAV 2 from substantially pitching or rolling when aligning the payload 6 with a portion of the surface 9 to be contacted by the payload 6. The location (position and orientation) of the pivot 5 relative to the surface 9 may be adjusted until the payload 6 lands on surface 9 by adjusting the location of the UAV 2 as it hovers in the vicinity of surface 9. The angular position of arm 3 relative to the UAV body frame 4 of UAV 2 may also be adjusted during flight.

Figure 3A:
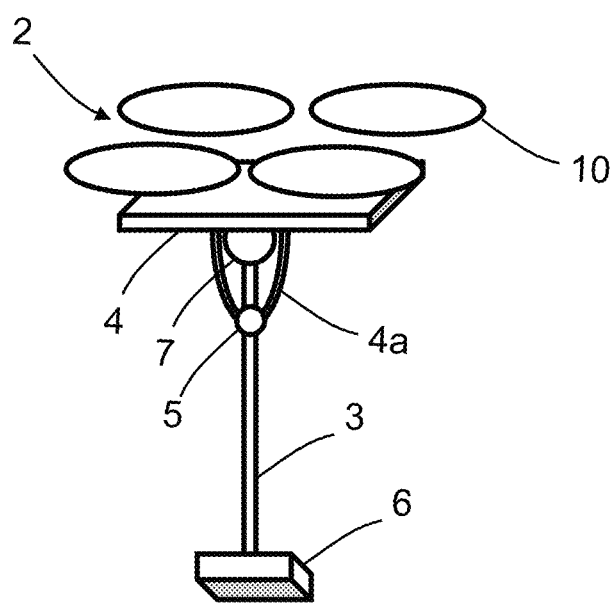
FIGS. 3A through 3D are diagrams representing respective three-dimensional views of a UAV having a pivotable arm for carrying a payload at successive stages during a process of transporting and placing the payload on a surface of a repairable structure.
Figure 3B:
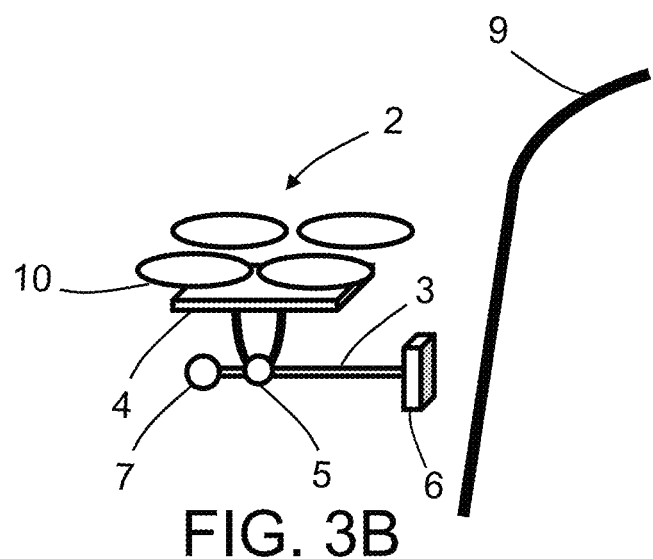
Figure 3C:
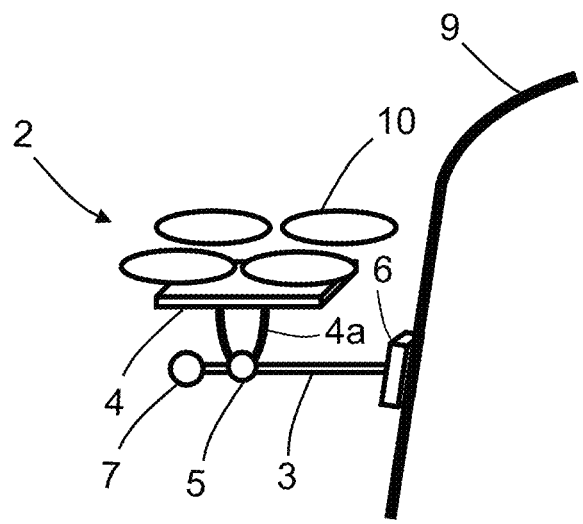
Figure 3D:
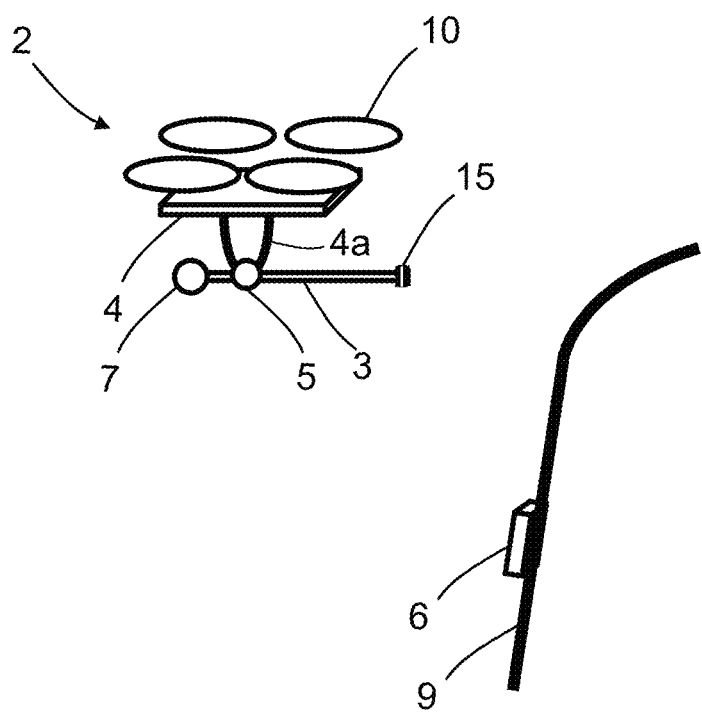

FIG. 3B depicts the UAV 2 flying toward the surface 9 while the arm 3 is oriented generally horizontal. Changing the angle of arm 3 may be accomplished using a motor (not shown in FIGS. 3A-3D) mounted to the pivot support 4a and operatively coupled to the arm 3 by a gear train (not shown in FIGS. 3A-3D) or using a linear actuator (not shown in FIGS. 3A-3D) that has one end connected to the pivot support 4a and another end connected to the arm 3 at a point located at a distance from the pivot 5. FIG. 3C depicts a stage wherein the payload 6 is lying flat against the surface 9 of the repairable structure. FIG. 3D depicts a stage wherein the UAV 2 is flying away from the surface 9 after the payload 6 has been uncoupled from the arm 3 while in the state depicted in FIG. 3C. The uncoupled payload 6 may stay attached to the surface 9 due to attachment forces exerted by a plurality of surface attachment devices (not shown in FIGS. 3A-3D), such as magnetic-based devices, e.g., an electro-permanent magnet, for ferromagnetic structures, and/or vacuum-based, electrostatic-based, adhesive-based, or gripper-based devices for non-ferromagnetic structure.

In accordance with one embodiment of a method for UAV-enabled measurement of the surface profile of a limited-access structure, a tool-equipped UAV of the type shown in FIG. 2 or 3A flies toward the structure to be repaired and lands at a location such that the payload 6 (e.g., a profilometer module) overlies to a potential anomalous area on the surface of the structure. Then the profilometer module is activated to perform a measurement procedure while the UAV 2 remains parked on the surface 9 and holds the profilometer module in place.

In accordance with an alternative embodiment, the coupling mechanism 15 is a quick-disconnect mechanism (e.g., a quick disconnect collet) adapted to hold the payload 6 during flight. The UAV 2 may be flown to a location in proximity to the anomalous area and then the payload 6 is placed on the surface of the structure. Surface attachment devices incorporated in the payload 6 (repair module or tool) may then be activated to temporarily but securely attach the payload 6 to the surface 9, following which the payload 6 may be uncoupled from the UAV 2. The UAV 2 is then free to take off from the surface 9, leaving the payload 6 (e.g., a profilometer module) to perform the automated measurement procedure.

The payload-carrying UAV 2 depicted in FIG. 2 or FIG. 3A is equally well adapted for use in inspecting a wide range of structures and objects including, but not limited to, aircraft, wind turbine blades, storage tanks, power lines, power-generating facilities, power grids, dams, levees, stadiums, large buildings, traveling bridges, large antennas and telescopes, water treatment facilities, oil refineries, chemical processing plants, high-rise buildings, and infrastructure associated with electric trains and monorail support structures. The system is also particularly well suited for use inside large buildings such as manufacturing facilities and warehouses. Virtually any structure that would be difficult, costly, or too hazardous to be inspected by a human controlling the inspection tool or module may potentially be inspected using the systems described herein. The method takes advantage of the broadening use of UAVs to reduce the cost, time, and ergonomic issues related to maintenance activities in aerospace and other industries.

This disclosure proposes a method for UAV-enabled measurement of a surface profile at limited-access locations. A UAV equipped with a profilometer module enables the acquisition of profile data. In addition to UAVs, robotic crawlers, robotic arms, or other automated placement systems may be used to place the profilometer module disclosed in some detail below on a surface of a limited-access structure.

In accordance with one embodiment, a UAV 2 is equipped with a video camera and configured to carry a profilometer module. The video camera is used to acquire images of an anomaly found on a surface as the UAV 2 hovers in proximity to the anomalous area. Using the acquired image data, an assessment is made whether surface profile measurement is warranted or not. If surface profile measurement is warranted, the UAV 2 places the profilometer module in contact with the surface at a position overlying the anomaly. Then the profilometer module is adhered to the surface. The profilometer module may remain attached to the UAV 2 during the measurement procedure or may be detached from the UAV 2 prior to the measurement procedure.

More specifically, this disclosure describes a method that uses a UAV equipped with a camera to perform a visual inspection and a profilometer to determine physical (e.g., geometric) characteristics of a potential anomaly for automated documentation, decision-making, and disposition. In accordance with one embodiment of the method, the UAV-enabled visual inspection identifies a potential scratch or coating crack or other line-shaped anomaly. To discriminate between a linear smudge or mark and a scratch or crack, the profile is measured using a surface profiler (hereinafter "profilometer").

In accordance with one embodiment, the method includes at least the following steps: (a) The UAV positions itself directly over the indicated potential anomaly, using visual feedback (manual or automatic). (b) The location of the potential anomaly, relative to the coordinate system (frame of reference) of the structure being inspected, is determined using an offboard positioning system (such as a local positioning system) and logged for tracking, monitoring, or future re-locating purposes. (c) At least three surface attachment devices are actuated to attach the profilometer module to the surface for stabilization, using vacuum adherence, electrostatic attachment, electro-permanent magnets (for ferromagnetic structures), or other attachment method. (d) Once the profilometer module is attached and stabilized, the profilometer is scanned across the area containing the potential line-shaped anomaly in a pattern that creates a depth profile of the surface at one or more positions along the potential line-shaped anomaly.

In accordance with one embodiment, the profilometer is a laser range meter or an electro-mechanical pit/crack depth gauge having a fine contact tip. The profilometer is moved across the surface by an electro-mechanical 2-D scanner. In accordance with an alternative embodiment, the profilometer may be a line laser profiler (i.e., an electro-optical 1-D scanner) which is moved across the surface by an electro-mechanical 1-D scanner. The depth information (also referred to herein as "profile data") is correlated to position, with the scanning of the measurement head being done by motorized scan traveling bridges incorporated in the profilometer module. In accordance with a further embodiment, 3-D laser profilometry (without mechanical scanning) could also be done, which costs more, but could be used with dents or 3-D surface anomaly. There are pros and cons to each method, so the applications and surface anomaly type will determine which profilometry method is chosen. The positionally correlated profile data is used to automatically determine whether the next step is "use-as-is", monitor, clean, repair (temporary or permanent), or do further assessments. Assessments are stored in a repository for the purpose of comparing the extent of a visual indication to other indications in the localized area so that early assessment of the potential for future widespread anomalies is provided. Most, if not all, of the dispositions listed above could be done remotely using a UAV 2.

Various embodiments of apparatus configured to measure the surface profile of a limited-access structure or object will be described in some detail below. A first embodiment includes an electro-mechanical profilometer mounted to an electro-mechanical 2-D scanner. A second embodiment includes an electro-optical profilometer mounted to an electro-mechanical 2-D scanner. A third embodiment includes a line laser profiler mounted to an electro-mechanical 1-D scanner. A fourth embodiment includes a 3-D laser scanner mounted to a frame.

FIG. 4A is a diagram representing a side view of a profilometer module 25 including an electro-mechanical depth measuring device 24a in accordance with one embodiment, which profilometer module 25 may be a payload carried by a UAV 2 of one of the types depicted in FIG. 2 or FIG. 3A or a type having a different design. The profilometer module 25 includes an attachment point 41 which may be coupled to (and uncoupled from) the payload support frame 8 of the UAV 2 depicted in FIG. 2. In alternative embodiments, the attachment point 41 may be coupled to one end of arm 3 by coupling mechanism 15 (shown in FIG. 3D). In alternative embodiments, the profilometer module 25 may be coupled to a surface-crawling robot vehicle. The profilometer module 25—when coupled to a UAV 2—forms an apparatus capable of measuring the profile of a surface 9 of a limited-access structure.

As seen in the proposed implementation depicted in FIG. 4A, the profilometer module 25 includes a frame 14 which may consist of rigid or semi-rigid members which are integrally formed or fastened or joined together. The frame 14 supports an electro-mechanical 2-D scanner (not shown in FIG. 4A, but see electro-mechanical 2-D scanner 17a in FIG. 6) that holds the electro-mechanical depth measuring device 24a (e.g., a contact displacement sensor). The electro-mechanical 2-D scanner 17a is mounted to a base 14a of frame 14. The base 14a has an opening which is configured to allow the electro-mechanical depth measuring device 24a to access and measure the area under the opening. The attachment point 41 is connected to or integrally formed with a top 14d of frame 14. The frame 14 further includes a multiplicity of vertical support members that connect the base 14a to the top 14d. Only two vertical support members 14b and 14c are visible in FIG. 14A. For example, the frame may have four vertical support members, the third and fourth vertical support members being disposed behind vertical support members 14b and 14c respectively in the view presented in FIG. 4A.

The frame 14 further includes a plurality of (at least three) standoff support members 18. A respective surface attachment device 27 is coupled to the distal end of each standoff support member 18. In the example measurement scenario depicted in FIG. 4A, the surface attachment devices 27 attach or adhere to a surface 9 having a dent 1d. The surface attachment devices 27 may be selected from the following types: magnetic-based devices (e.g., an electro-permanent magnet) for ferromagnetic structures, and/or vacuum-based, electrostatic-based, adhesive-based, gripper-based devices for non-ferromagnetic structure. The standoff support members 18 and surface attachment devices 27 form a standoff system that maintains the electro-mechanical depth measuring device 24a in a standoff position relative to the surface 9.

In the measurement scenario depicted in FIG. 4A, the profilometer module 25 is located so that the electro-mechanical depth measuring device 24a overlies the dent 1d. In accordance with one proposed implementation, the electro-mechanical depth measuring device 24a has a stylus 11 which is displaceable in opposite directions which are parallel to a Z-axis. As the stylus 11 displaces downward toward the dent 1d, an encoder (not shown in FIG. 4A) measures (counts) the amount of stylus displacement. When the tip of the stylus 11 contacts the surface of the dent 1d, a switch is opened that stops the count. The final count represents the depth of the point of surface 9 contacted by the tip of the stylus 11 relative to a reference plane of the profilometer module 25. This measurement process may be repeated at different positions of the electro-mechanical depth measuring device 24a, which may be moved intermittently by the scanner (not shown in FIG. 4A) along a predetermined scanning path.

Figure 4B:
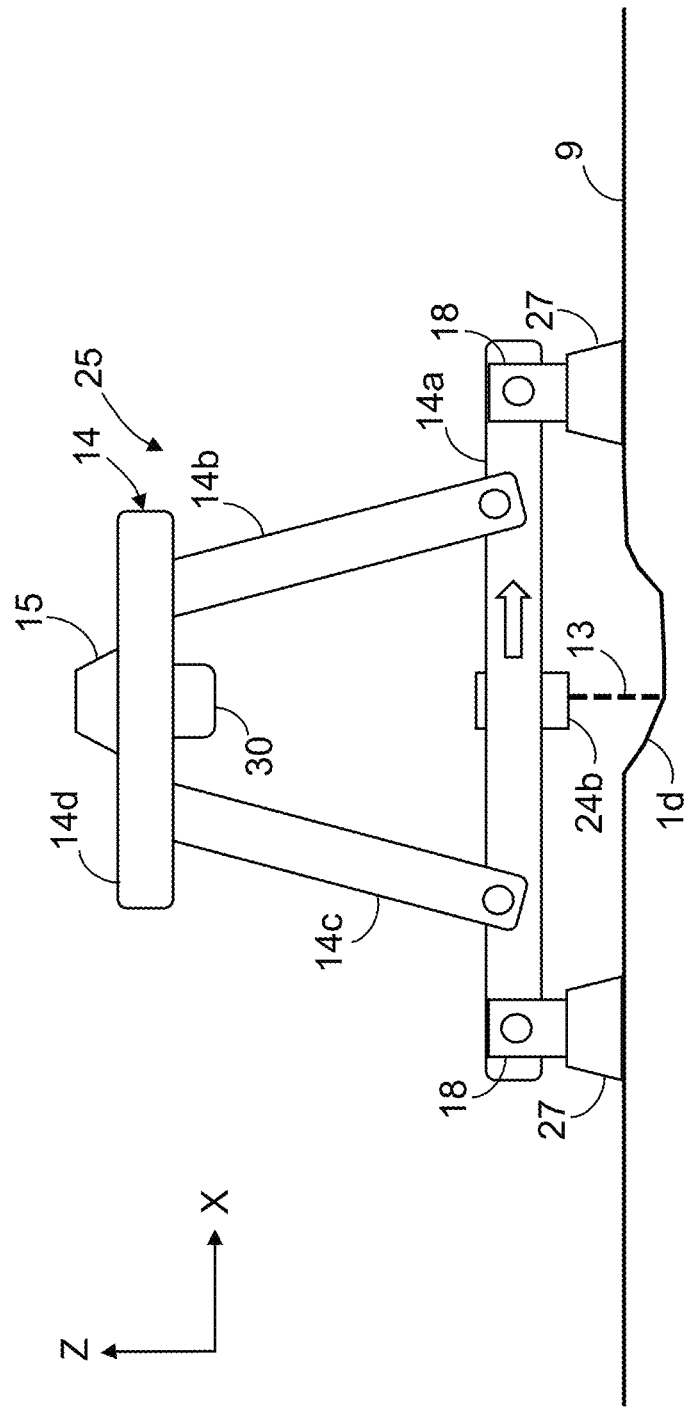
FIG. 4B is a diagram representing a side view of a profilometer module including a laser range meter in accordance with another embodiment, which profilometer module may be a payload carried by a UAV of one of the types depicted in FIG. 2 or FIG. 3A or a type having a different design.

FIG. 4B is a diagram representing a side view of a profilometer module 25 including an electro-optical depth measuring device 24b in accordance with another embodiment, which profilometer module 25 may be a payload carried by a UAV 2 of one of the types depicted in FIG. 2 or FIG. 3A or a type having a different design. The frame 14 of the profilometer module 25 depicted in FIG. 4B may be identical to the frame 14 depicted in FIG. 4A. Likewise the frame 14 supports an electro-mechanical 2-D scanner (not shown in FIG. 4B, but see electro-mechanical 2-D scanner 17a in FIG. 6) that holds the electro-optical depth measuring device 24b (e.g., a laser range meter). The electro-optical depth measuring device 24b—like the electro-mechanical depth measuring device 24a—is a point-type profilometer, meaning that it acquires depths one point at a time.

In the measurement scenario depicted in FIG. 4B, the profilometer module 25 is located so that the electro-optical depth measuring device 24b overlies the dent 1d. In accordance with one proposed implementation, the electro-optical depth measuring device 24b is a laser range meter comprising a laser that emits a laser beam which propagates parallel to the Z-axis and then impinges on the surface of the dent 1d to form a laser spot. The laser range meter is configured to measure the distance to the laser spot. The most common form of laser range meter operates on the time-of-flight principle by sending a laser pulse in a narrow beam towards the surface 9 and measuring the time taken by the pulse to be reflected off the surface 9 and returned to a photodetector incorporated in the laser range meter. With the speed of light known and an accurate measurement of the time interval between emission and detection, the distance from the laser range meter to the laser spot can be calculated. In accordance with one proposed implementation, multiple pulses are fired sequentially at a single point on the dent 1*d* and the average depth at that point relative to a reference plane of the profilometer module 25 is calculated. This measurement process may be repeated at different positions of the electro-optical depth measuring device 24*b*, which may be moved intermittently by the scanner (not shown in FIG. 4B) along a predetermined scanning path.

Figure 5:
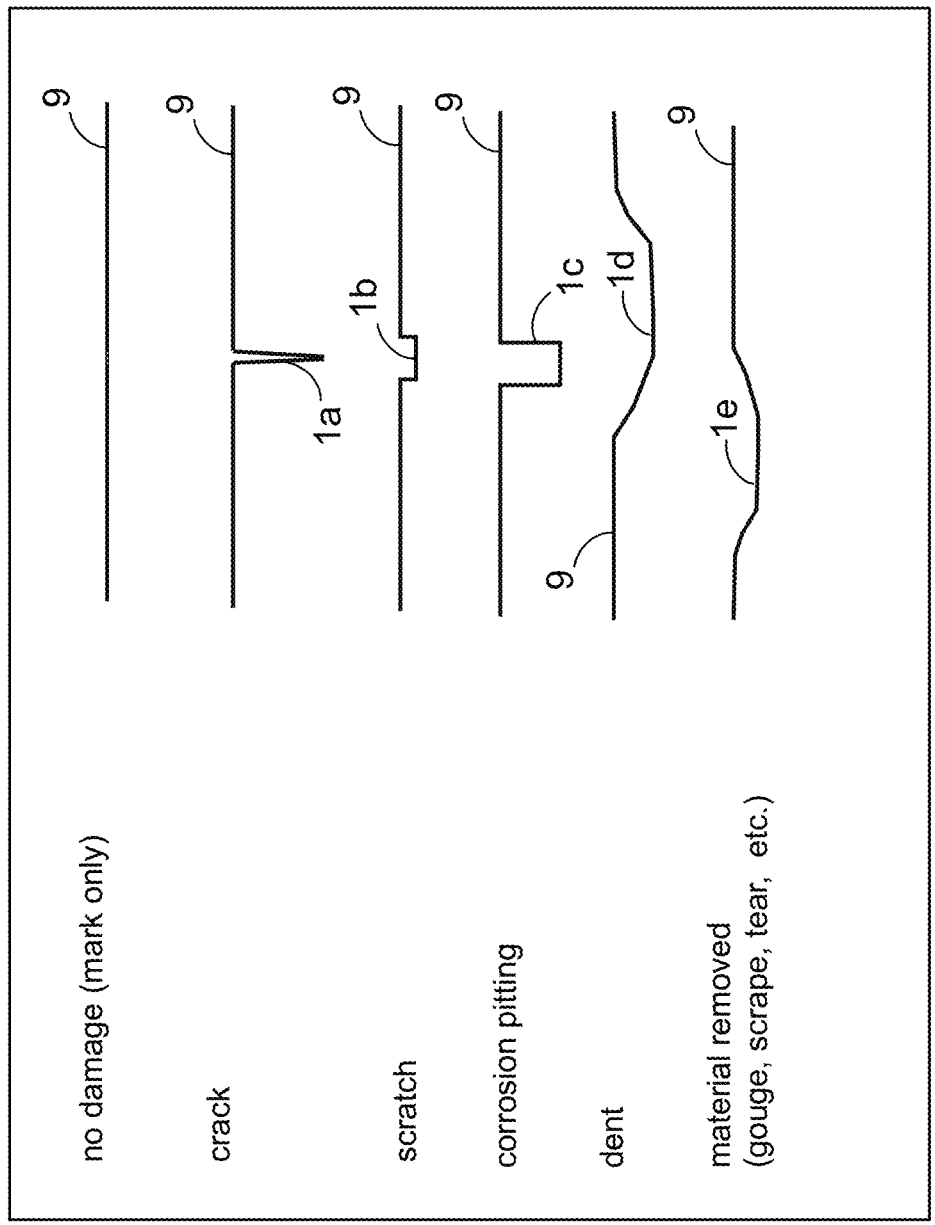
FIG. 5 is a diagram showing profiles of surfaces having different types of anomalies.

In the scenarios depicted in FIGS. 4A and 4B, each time the depth measuring device traverses the dent 1*d*, profile data is acquired representing the profile of dent 1*d* along each particular scan path. FIG. 5 is a diagram showing profiles of surfaces having different types of anomalies. The first profile shows no damage to the surface 9 (meaning that the anomaly indication was only a mark); the second profile includes a shape indicating the presence of a crack 1*a*; the third profile includes a shape indicating the presence of a scratch 1*b*; the fourth profile includes a shape indicating the presence of corrosion pitting 1*c*; the fifth profile includes a shape indicating the presence of a dent 1*d*; and the sixth profile includes a shape indicating a cavity 1*e* (e.g., a gouge, scrape or tear) where material has been removed from surface 9.

Figure 6:
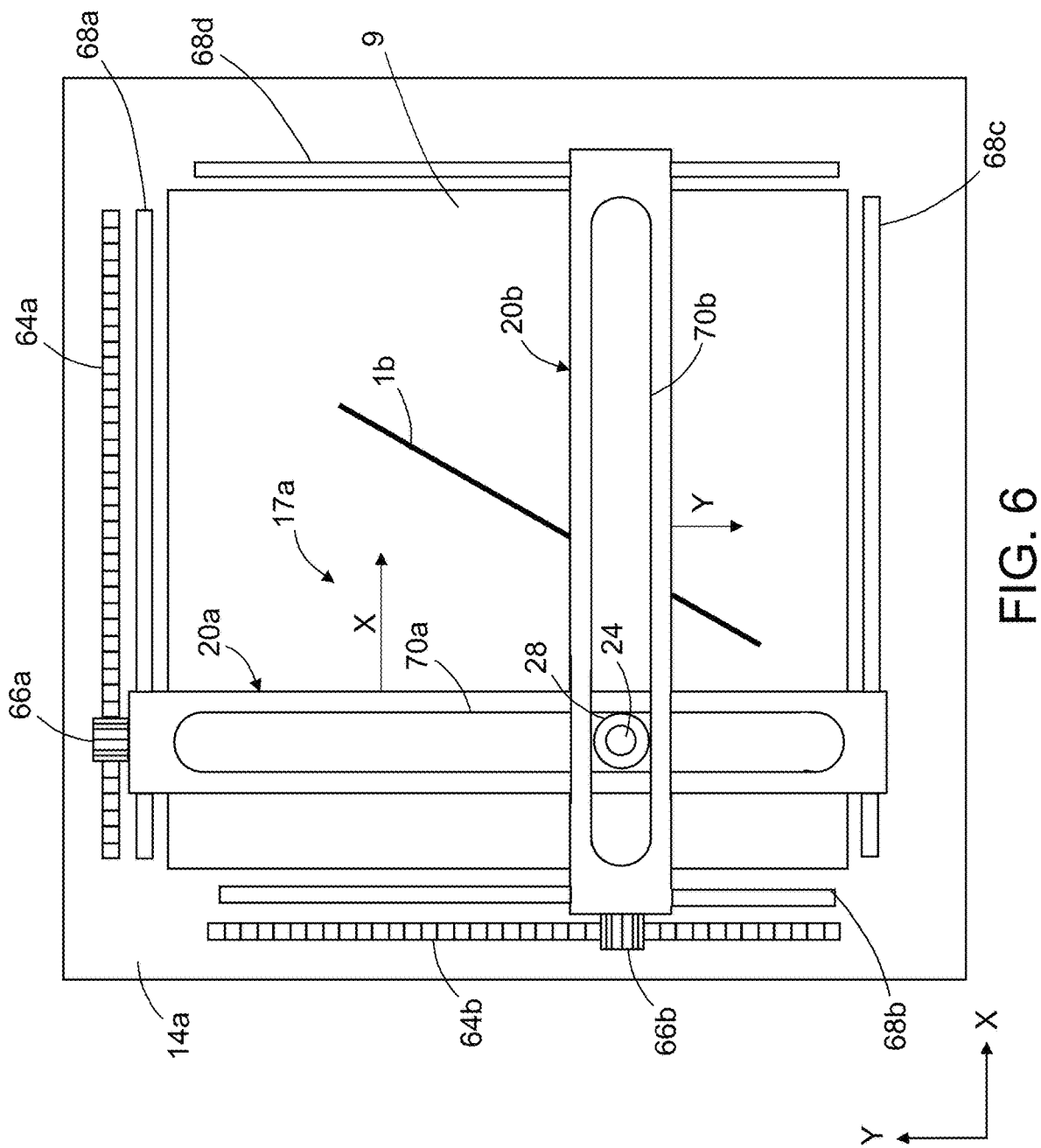
FIG. 6 is a diagram showing a top view of an electro-mechanical two-dimensional (2-D) scanner overlying a scratch or crack or other line-shaped anomaly in a surface. The scanner includes a holder that holds a point-type profilometer, such as the contact displacement sensor shown in FIG. 4A or the laser range meter shown in FIG. 4B, for acquiring profile data over a 2-D area on a surface.

In accordance with embodiments having a depth measuring device in the form of a point-type profilometer, that point-type profilometer is moved over a two-dimensional (2-D) area by means of an electro-mechanical 2-D scanner. FIG. 6 is a diagram showing a top view of an electro-mechanical 2-D scanner 17*a* in accordance with one proposed implementation. The electro-mechanical 2-D scanner 17*a* overlies a line-shaped anomaly in the form of a scratch 1*b* in a surface 9. The electro-mechanical 2-D scanner 17*a* includes a device holder 28 that holds a depth measuring device 24 (such as the electro-mechanical depth measuring device 24*a* shown in FIG. 4A or the electro-optical depth measuring device 24*b* shown in FIG. 4B) for acquiring profile data over a 2-D area on surface 9. The electro-mechanical 2-D scanner 17*a* is movably coupled to the base 14*a* of the module frame. The depth measurement device 24 is supported by the electro-mechanical 2-D scanner 17*a* and configured to measure a depth of a target point on a surface 9 of a structure when the plurality of surface attachment devices 27 are in contact with the surface. A computer (not shown in FIG. 6, but see computer 42 in FIG. 12) is programmed to control the electro-mechanical 2-D scanner 17*a* and the depth measurement device 24 so that the depth measurement device 24 acquires profile data at multiple points along a predefined scan path (e.g., the serpentine scan path 98 depicted in FIG. 6A).

In accordance with the embodiment depicted in FIG. 6, the electro-mechanical 2-D scanner 17*a* includes a first traveling bridge 20*a* that is slidably coupled to the base 14*a* of the module frame for translation in an X direction and has a longitudinal slot 70*a*; and a second traveling bridge 20*b* that is slidably coupled to the base 14*a* for translation in a Y direction (perpendicular to the X direction) and has a longitudinal slot 70*b* that crosses the longitudinal slot 70*a*. The depth measurement device 24 is supported by the device holder 28 at a crossing of the longitudinal slots 70*a* and 70*b*. The device holder 28 has a first portion that is coupled to longitudinal slot 70*a* in a manner that enables the depth measurement device 24 to translate in an X direction and a second portion that is coupled to longitudinal slot 70*b* in a manner that enables the depth measurement device 24 to translate in a Y direction. For example, the device holder 28 may have one annular projection which slides in respective linear grooves formed in the sides of longitudinal slot 70*a* and another annular projection which slides in respective linear grooves formed in the sides of longitudinal slot 70*b*. In alternative implementations, various types of bearings may be employed.

The first and second traveling bridges 20*a* and 20*b* are independently translatable in the X and Y directions respectively. For example, the first traveling bridge 20*a* may translate in the X direction while the second traveling bridge 20*b* does not move relative to base 14*a*, in which case the depth measurement device 24 is moved in the X direction while sliding in longitudinal slot 70*b* in the second traveling bridge 20*b*. Conversely, the second traveling bridge 20*b* may translate in the Y direction while the first traveling bridge 20*a* does not move relative to base 14*a*, in which case the depth measurement device 24 is moved in the Y direction while sliding in longitudinal slot 70*a* in the first traveling bridge 20*a*. Such movements may be included in a planned scan path, such as the serpentine scan path 98 depicted in FIG. 6A.

Still referring to FIG. 6, the first traveling bridge 20*a* has respective bearing guides (not shown in FIG. 6) at opposite ends thereof, which bearing guides travel (e.g., slide or roll) along respective guide rails 68*a* and 68*c* disposed on opposing sides of the base 14*a*. The first traveling bridge 20*a* further includes a motor (not shown in FIG. 6) that is operatively coupled to a first pinion gear 66*a*. The first pinion gear 66*a* has teeth which engage teeth of a first rack 64*a* that is disposed parallel to and spaced apart from the guide rail 68*a*. The motor may be activated to drive rotation of the first pinion gear 66*a*, which in turn causes the first traveling bridge 20*a* to translate in the X direction on guide rails 68*a* and 68*c*.

Similarly, the second traveling bridge 20*b* has respective bearing guides (not shown in FIG. 6) at opposite ends thereof, which bearing guides travel (e.g., slide or roll) along respective guide rails 68*b* and 68*d* disposed on the other opposing sides of the base 14*a*. The second traveling bridge 20*b* further includes a motor (not shown in FIG. 6) that is operatively coupled to a second pinion gear 66*b*. The second pinion gear 66*b* has teeth which engage teeth of a second rack 64*b* that is disposed parallel to and spaced apart from the guide rail 68*b*. The motor may be activated to drive rotation of the second pinion gear 66*b*, which in turn causes the second traveling bridge 20*b* to translate in the Y direction on guide rails 68*b* and 68*d*.

Other linear drive means may be substituted for the rack and pinion arrangement shown in FIG. 6, such as a lead screw threadably coupled to a nut incorporated in a bearing guide or carriage. In the latter case, the drive motors would be mounted to the base 14*a* of the module frame 14 rather than mounted to the traveling bridges as is the case when the drive mechanism is a pinion gear.

Instead of bearing guides sliding or rolling on guide rails, the first and second traveling bridges 20*a* and 20*b* may be translatably coupled to the base 14*a* of module frame 14 by means of linear motion guides. In this implementation, each guide comprises a respective pair of slidably coupled linear motion guide halves. One pair of linear motion guides translatably couples the first traveling bridge 20*a* to two opposing sides of base 14*a*; another pair of linear motion guides translatably couples the second traveling bridge 20*b* to the other two opposing sides of base 14*a*. As used herein, the term "linear motion guide half" means a structure having a straight surface that guides a contacting surface of another linear motion guide half to move linearly during relative motion of the two halves. More specifically, the term "linear motion guide half" includes, but is not limited to, male and female slide halves well known in the art.

FIG. 6A is a diagram showing a serpentine scan path 98 that crosses a line-shaped anomaly at multiple points. In this example, the line-shaped anomaly is a scratch 1*b* in a surface 9. The controller for the electro-mechanical 2-D scanner 17*a* may be configured such that the depth measurement device 24 follows serpentine scan path 98. The depth measurement device 24 measures the depth of the scratch and outputs profile data in the form of electrical signals containing depth measurement results. FIG. 6B is a diagram showing successive signals representing profile data 23 acquired by the depth measurement device 24 (shown in FIG. 6) during intermittent crossings back and forth across the scratch 1*b*.

Figure 7:
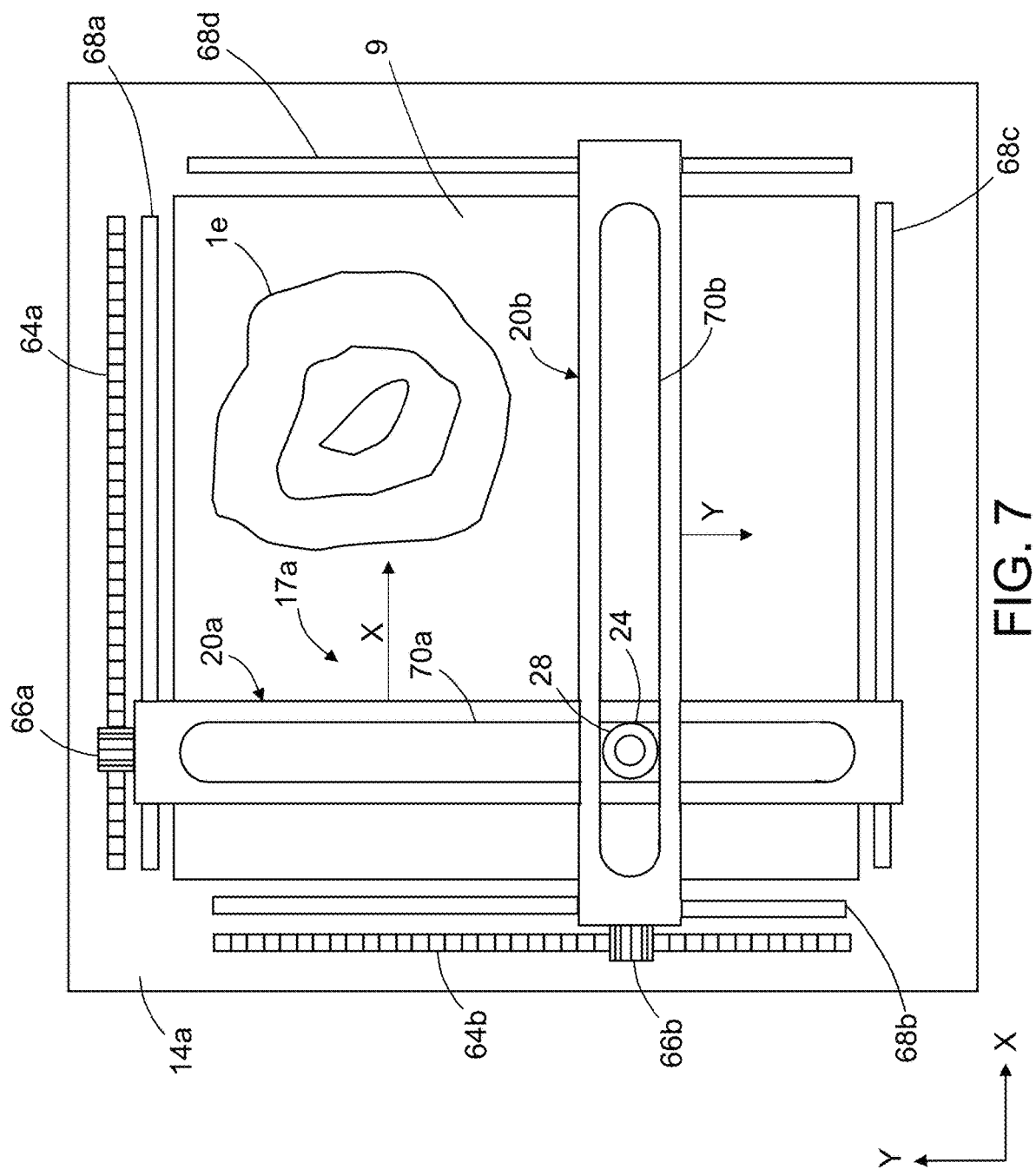
FIG. 7 is a diagram showing a top view of an electro-mechanical 2-D scanner overlying a dent or gouge or other cavity-type anomaly where material has been removed from the surface (hereinafter "cavity"). The scanner includes a holder that holds a point-type profilometer, such as the contact displacement sensor shown in FIG. 4A or the laser range meter shown in FIG. 4B, for acquiring profile data from a surface.
Figures 7A, 7B:
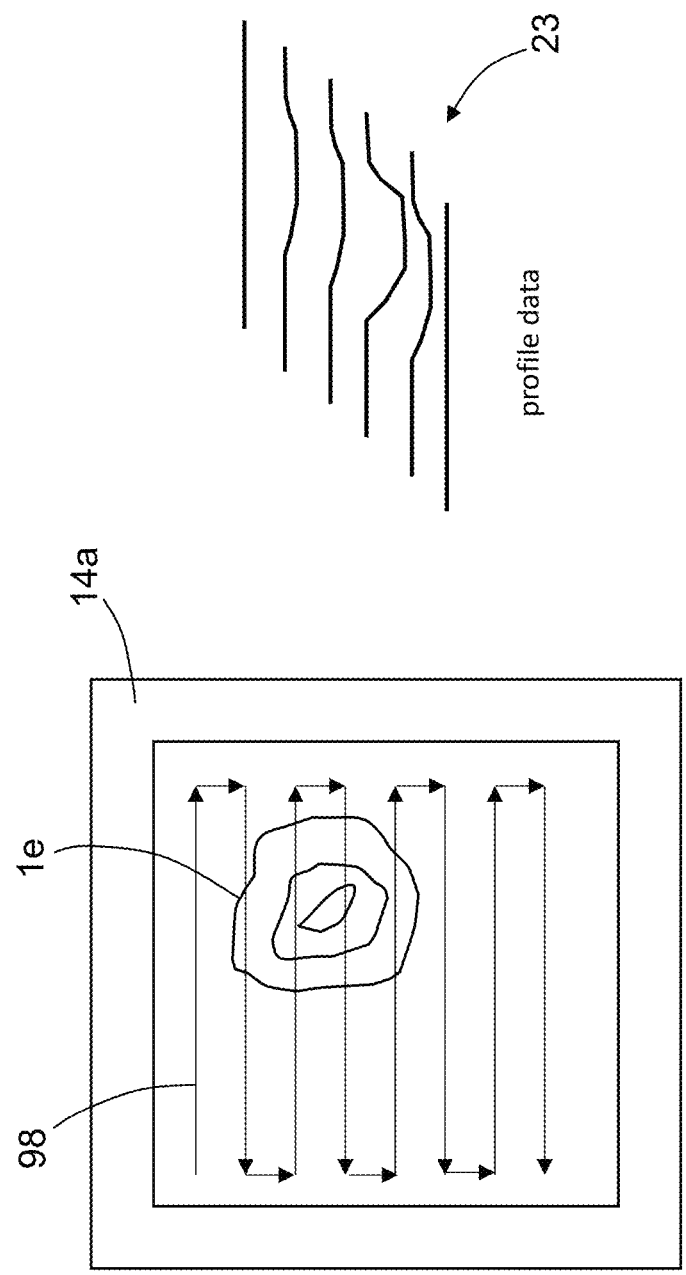
FIG. 7A is a diagram showing a serpentine scan path that crosses a cavity-shaped anomaly in a surface. The controller for the electro-mechanical 2-D scanner may be configured such that the point-type profilometer held by the 2-D scanner shown in FIG. 7 follows a serpentine path that crosses the anomaly along multiple line segments.
FIG. 7B is a diagram showing successive signals representing profile data acquired as the point-type profilometer shown in FIG. 7 intermittently crosses the anomaly shown in FIG. 7A.

FIG. 7 is a diagram showing a top view of electro-mechanical 2-D scanner 17*a* overlying a cavity 1*e* (e.g., a gouge, scrape or tear) where material has been removed from surface 9. The structure and functionality of the electro-mechanical 2-D scanner 17*a* have already been described with reference to FIG. 6, which description will not be repeated here. FIG. 7A is a diagram showing a serpentine scan path 98 that crosses the cavity 1*e* in surface 9 along multiple scan lines. The controller for the electro-mechanical 2-D scanner 17*b* may be configured such that the depth measurement device 24 measures depth (acquires profile data) at multiple points along each of a multiplicity of scan lines as it follows serpentine scan path 98. FIG. 7B is a diagram showing successive signals representing profile data 23 acquired as the depth measurement device 24 (shown in FIG. 7) measures the depth of cavity 1*e* along regularly spaced scan lines.

Figure 8:
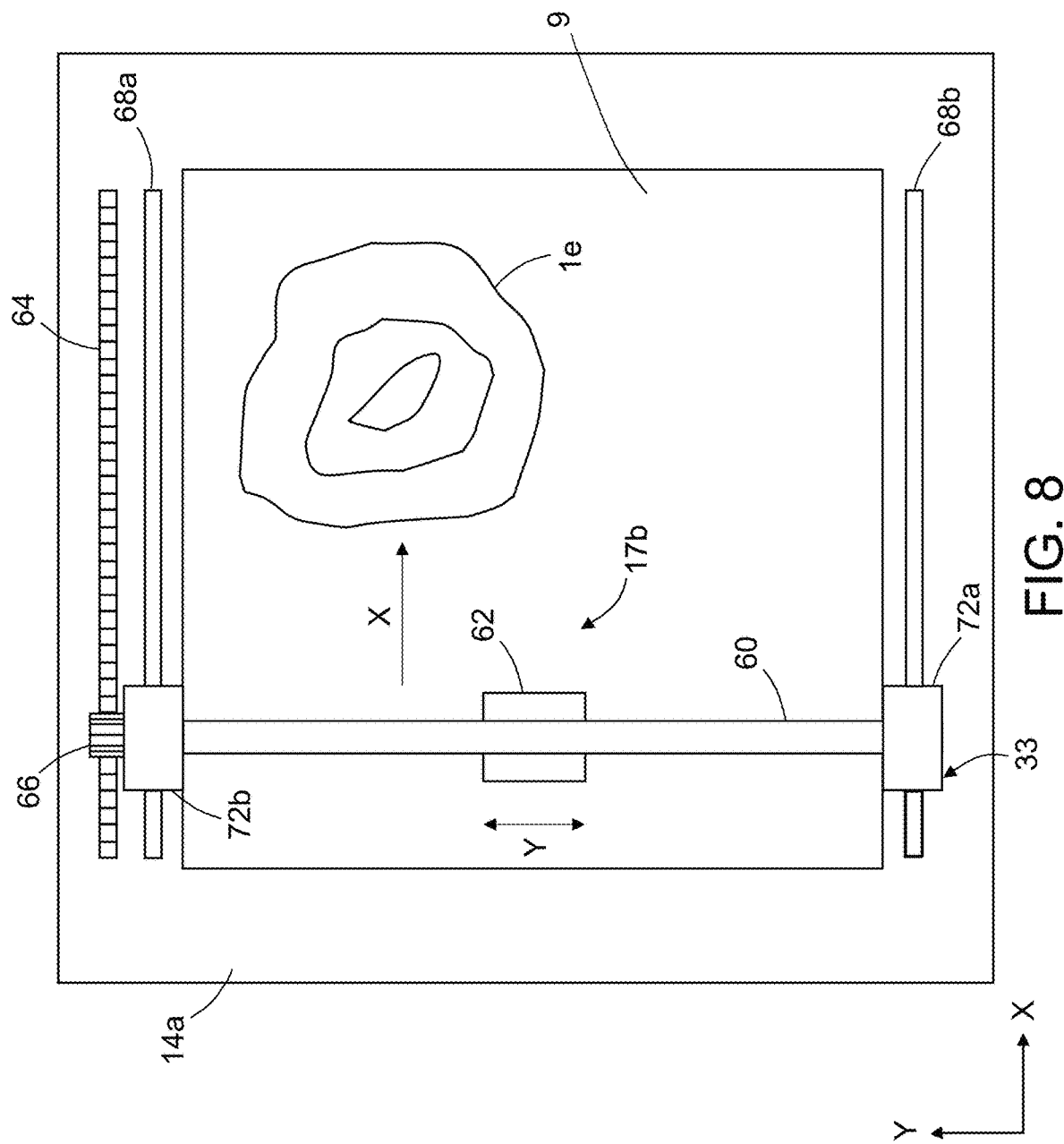
FIG. 8 is a diagram showing a top view of an electro-mechanical 2-D scanner in accordance with an alternative embodiment. The scanner includes a carriage that carries a depth measurement device and is translatable along a traveling bridge having an axis, which traveling bridge in turn is translatable along another axis which is perpendicular to the traveling bridge axis.

FIG. 8 is a diagram showing a top view of an electro-mechanical 2-D scanner 17*b* in accordance with an alternative embodiment. The electro-mechanical 2-D scanner 17*b* comprises a traveling bridge 20*c* that includes a guide rail 60 and a carriage 62 that is slidably coupled to the guide rail 60. The carriage 62, which carries a depth measurement device (not visible in FIG. 8), is translatable along the guide rail 60 in a Y direction. The traveling bridge 20*c* is translatable in an X direction. More specifically, the opposing ends of the guide rail 60 are supported by respective bearing guides 72*a* and 72*b*. The bearing guides 72*a* and 72*b* respectively travel along a pair of mutually parallel guide rails 68*a* and 68*b* during movement in the X direction. The guide rails 68*a* and 68*b* are disposed on opposing sides of the base 14*a* of the module frame 14. The electro-mechanical 2-D scanner 17*b* further includes a motor (not shown in FIG. 8) that is operatively coupled to a pinion gear 66. The pinion gear 66 has teeth which engage teeth of a rack 64 that is disposed parallel to and spaced apart from the guide rail 68*a*. The motor may be activated to drive rotation of the pinion gear 66, which in turn causes the guide rail 60 to translate in the X direction on guide rails 68*a* and 68*b*.

The traveling bridge 20*c* and carriage 62 are independently translatable in the X and Y directions respectively. For example, the traveling bridge 20*c* may translate in the X direction while the carriage 62 does not move relative to guide rail 60, in which case the depth measurement device 24 is moved in the X direction. Conversely, the carriage 62 may translate relative to guide rail 60 while the traveling bridge 20*c* does not move relative to base 14*a*, in which case the depth measurement device 24 is moved in the Y direction. Such movements may be included in a planned scan path, such as the serpentine scan path 98 depicted in FIG. 6A.

Figure 9:
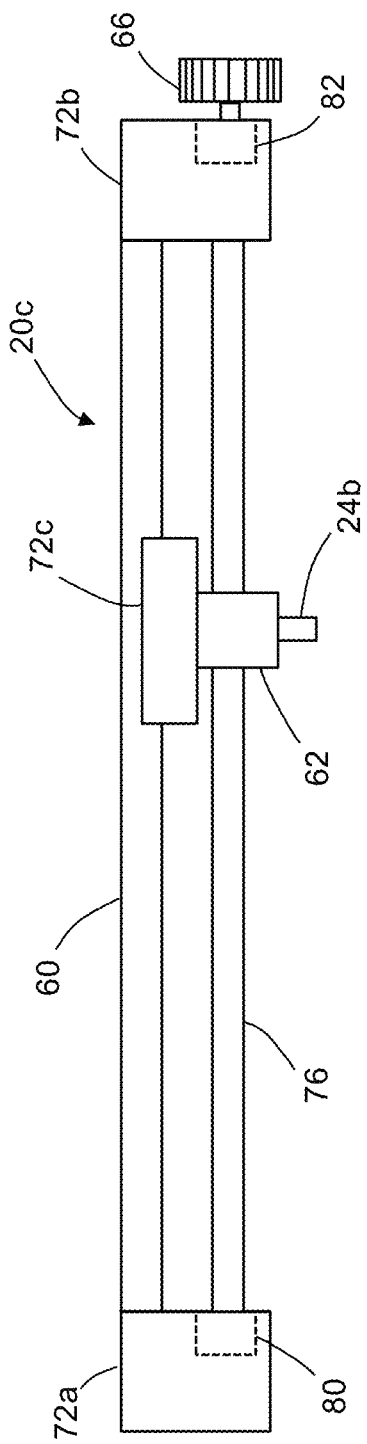
FIG. 9 is a diagram showing a side view of the electro-mechanical 2-D scanner depicted in FIG. 8.

FIG. 9 is a diagram showing a side view of portions of the electro-mechanical 1-D scanner 17*b* depicted in FIG. 8. The traveling bridge 20*c* includes bearing guides 72*a* and 72*b* which respectively travel (e.g., slide or roll) along the guide rails 68*a* and 68*b* (see FIG. 8). The traveling bridge 20*c* further includes a motor 82 that is operatively coupled (via an output shaft) to the pinion gear 66. The pinion gear 66 has teeth which engage teeth of the rack 64 seen in FIG. 8. Opposed ends of the guide rail 60 are fixedly coupled to the bearing guides 72*a* and 72*b*. The traveling bridge 20*c* further includes a bearing guide 72*c* which is slidably coupled to the guide rail 60 and a carriage 62 which is fixedly coupled to the bearing guide 72*c*. An electro-optical depth measuring device 24*b* is fixedly coupled to the carriage 62, having a dependent configuration to enable measuring the depth of a confronting contact point in the area underlying the opening in base 14*a* (see FIG. 8).

A drive mechanism operatively couples the carriage 62 to a motor 80. The drive mechanism includes a lead screw 76 and a nut (within carriage 62) that threadably engages the lead screw 76. The nut is installed inside a cavity formed in the carriage 62. The coupling of carriage 62 to the lead screw 76 by means of the nut enables the bearing guide 72*c* to translate (by sliding) along the guide rail 60 when the lead screw 76 is driven to rotate by motor 80. The opposing ends of lead screw 76 are supported by respective bearings (not shown in FIG. 9). Rotation of lead screw 76 may be driven by motor 80 via a belt (not shown) which circulates on respective pulleys. In other embodiments, the lead screw could be driven directly by the motor. Other options include gear drive or chain drive. In accordance with one proposed implementation, the bearing guide 72*c* comprises a series of recirculating ball bearings, the balls of which roll along the guide rail 60. Optionally, the position of the carriage 62 along the guide rail 60 can be measured by a position sensor (e.g., a rotation encoder coupled to the lead screw 76) to provide position feedback to the motor controller (not shown in FIG. 9) that controls carriage translation in the Y direction. Similarly, the position of the traveling bridge 20*c* along the guide rail 68*a* (see FIG. 8) can be measured by a position sensor to provide position feedback to the motor controller that controls traveling bridge translation in the X direction.

Figure 10:
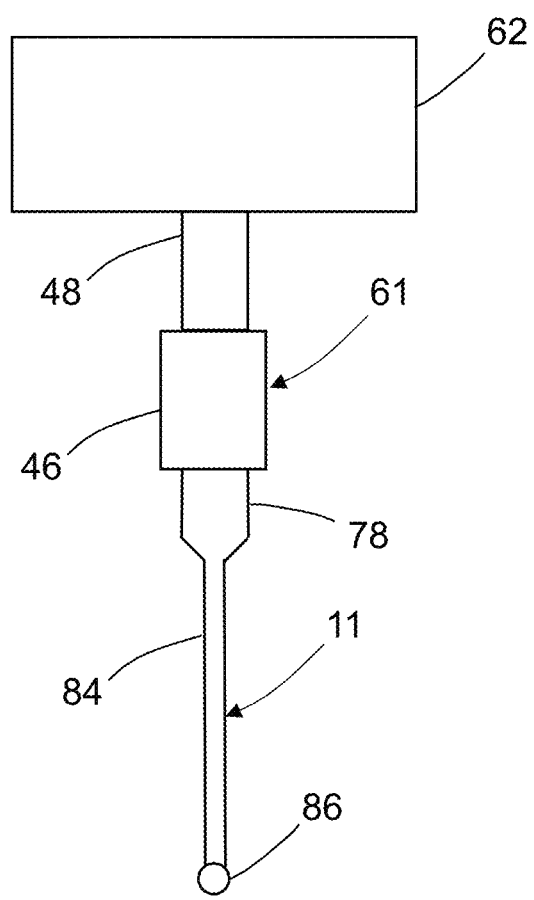
FIG. 10 is a diagram showing a side view of a carriage-mounted contact displacement sensor in accordance with one embodiment.

In accordance with an alternative embodiment, an electro-mechanical depth measuring device (e.g., a contact displacement sensor) may be substituted for the electro-optical depth measuring device 24*b* indicated in FIG. 9. FIG. 10 is a side view of a contact displacement sensor 61 mounted to the carriage 62. The contact displacement sensor 61 includes a gauge body 48 that is attached to the carriage 62 and a stylus holder 46 that is configured to slide telescopically up and down along the guide body 48. Axial displacement of the stylus holder 46 relative to the gauge body (in either Z direction) is driven by a motor and gear train not shown in FIG. 10.

The contact displacement sensor 61 further includes a stylus 11 that is displaceably coupled to the stylus holder 46. As used herein, the phrase "displaceably coupled" means that the parts are coupled yet displaceable relative to each other. The stylus includes a base end 78 that is slidable inside the stylus holder 46, a stylus shaft 84 integrally formed with base end 78, and a contact tip 86 integrally formed on the distal end of stylus shaft 84. When the carriage 62 is attached to the bearing guide 72*c* (see FIG. 9), the axis of stylus shaft 84 will be aligned with (parallel to) the Z-axis (which is perpendicular to the X- and Y-axes). The internal structure of the contact displacement sensor 61 includes a wire spring (elastic member) that is configured to urge the stylus 11 downward and away from the stylus holder 46. However, the wire spring merely resists but does not prevent relative movement of the stylus 11 toward the stylus holder 46 when the contact tip 86 contacts a confronting surface as the stylus holder 46 continues to move toward that surface.

During a depth measurement, the stylus holder 46 and stylus 11 (and intervening wire spring) move in unison toward a point on a confronting surface whose depth will be measured. During this displacement, the base end 78 of the stylus 11 is in contact with the wire spring. The stylus holder 46 has a substantially circular cylindrical shape. When the stylus holder 46 is moved in the Z direction to bring the contact tip 86 of stylus 11 into contact with the confronting surface, the stylus 11 stops (compressing the wire spring slightly) while the stylus holder 46 continues to move toward the surface, causing a minute displacement of the stylus 11 relative to the stylus holder 46. A stylus displacement detecting means (not illustrated) detects the change in the axial position of the stylus 11 relative to the stylus holder 46 which occurs during this minute displacement. For example, the stylus displacement detecting means may be an electrical switch that closes precisely when the minute displacement occurs. In alternative embodiments, plunger coils or Hall effect sensors may be used to detect deflections of the stylus 11 relative to the stylus holder 46.

Figure 11:
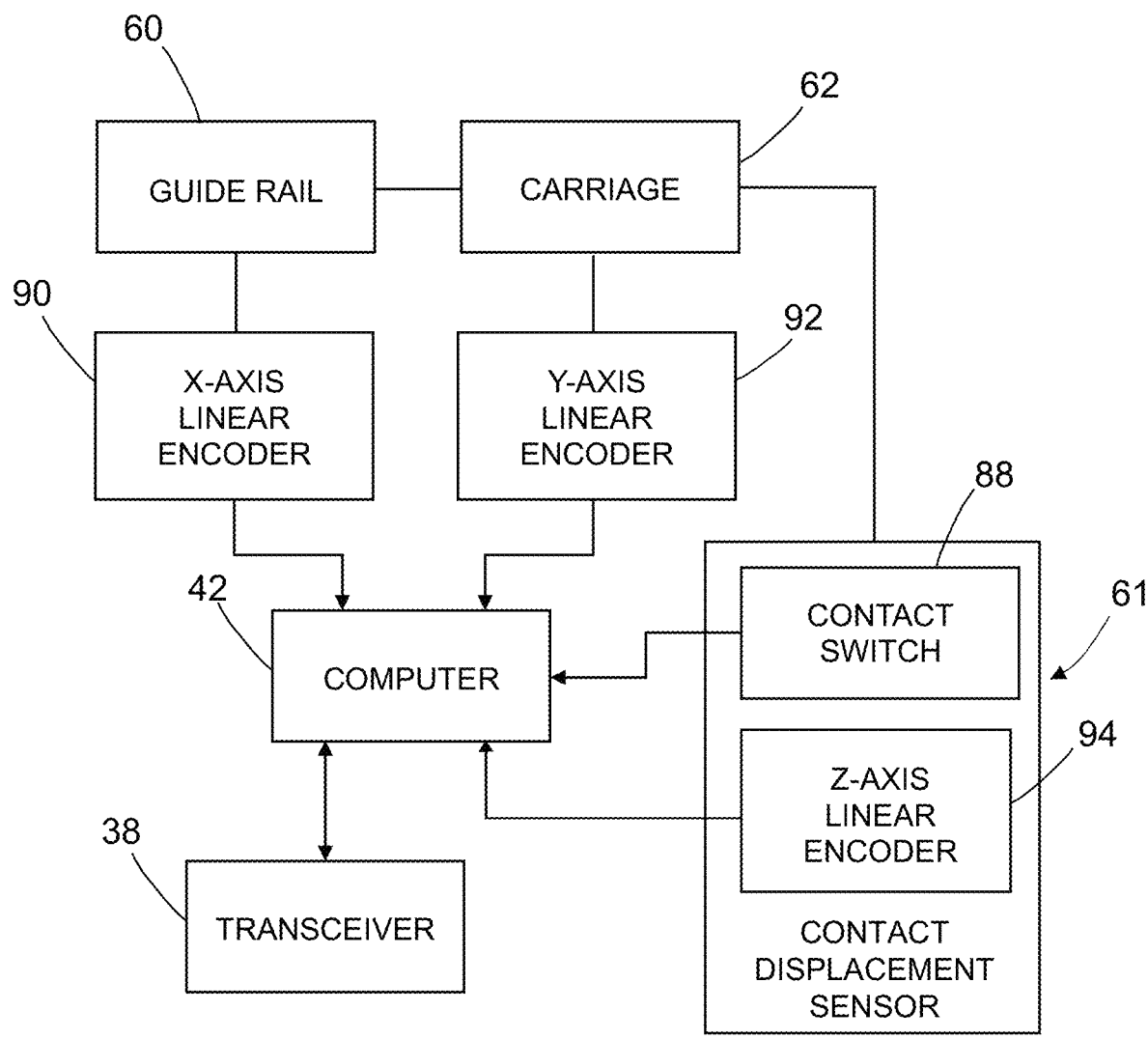
FIG. 11 is a block diagram identifying some components of a system for measuring a surface profile by scanning a contact displacement sensor over an area of a surface.

FIG. 11 is a block diagram identifying some components of a system for measuring a surface profile by scanning the contact displacement sensor 61 partly depicted in FIG. 10 over an area of a surface using the traveling bridge 20c partly depicted in FIG. 9. The system depicted in FIG. 11 includes a computer 42 that is programmed to collect encoded data representing the spatial coordinates of the contact tip 86 of the contact displacement sensor 61 at the time of contact with a confronting surface. The contact displacement sensor 61 is mounted to the carriage 62, which carriage 62 is translatable along the guide rail 60 in the Y direction. The Y position of the carriage 62 is tracked using a Y-axis linear encoder 92. The guide rail 60 is in turn translatable in the X direction. The X position of the guide rail 60 is tracked using an X-axis linear encoder 90. The stylus 11 of the contact displacement sensor 61 is displaceable (translatable) in the Z direction. The Z position of the stylus 11 is tracked using a Z-axis linear encoder 94. For the measurement process, the contact displacement sensor 61 is moved along the guide rail 60 laterally to an X-Y coordinate position and then the stylus 11 is moved in the Z direction toward the confronting surface until the contact tip 86 touches a measurement point on the surface. At the time of impingement, the contact switch 88 is closed, which change in state causes an electrical signal representing depth data to be sent to the computer 42. The depth data includes the depth of the surface point where the contact tip 86 impinged. The computer 42 also receives electrical signals from the X- and Y-axes linear encoders 90 and 92, which signals representing X and Y position data. The computer 42 is configured (programmed) to determine the spatial coordinates of the measurement point from the axial position of the contact tip 86 (represented by a Z coordinate) and from the position of the contact displacement sensor 61 (as represented by the X coordinate of the guide rail 60 and the Y coordinate of the carriage 62). The computer is also configured to send the measurement results to the transceiver 38 for transmission to the ground control station.

Figure 12:
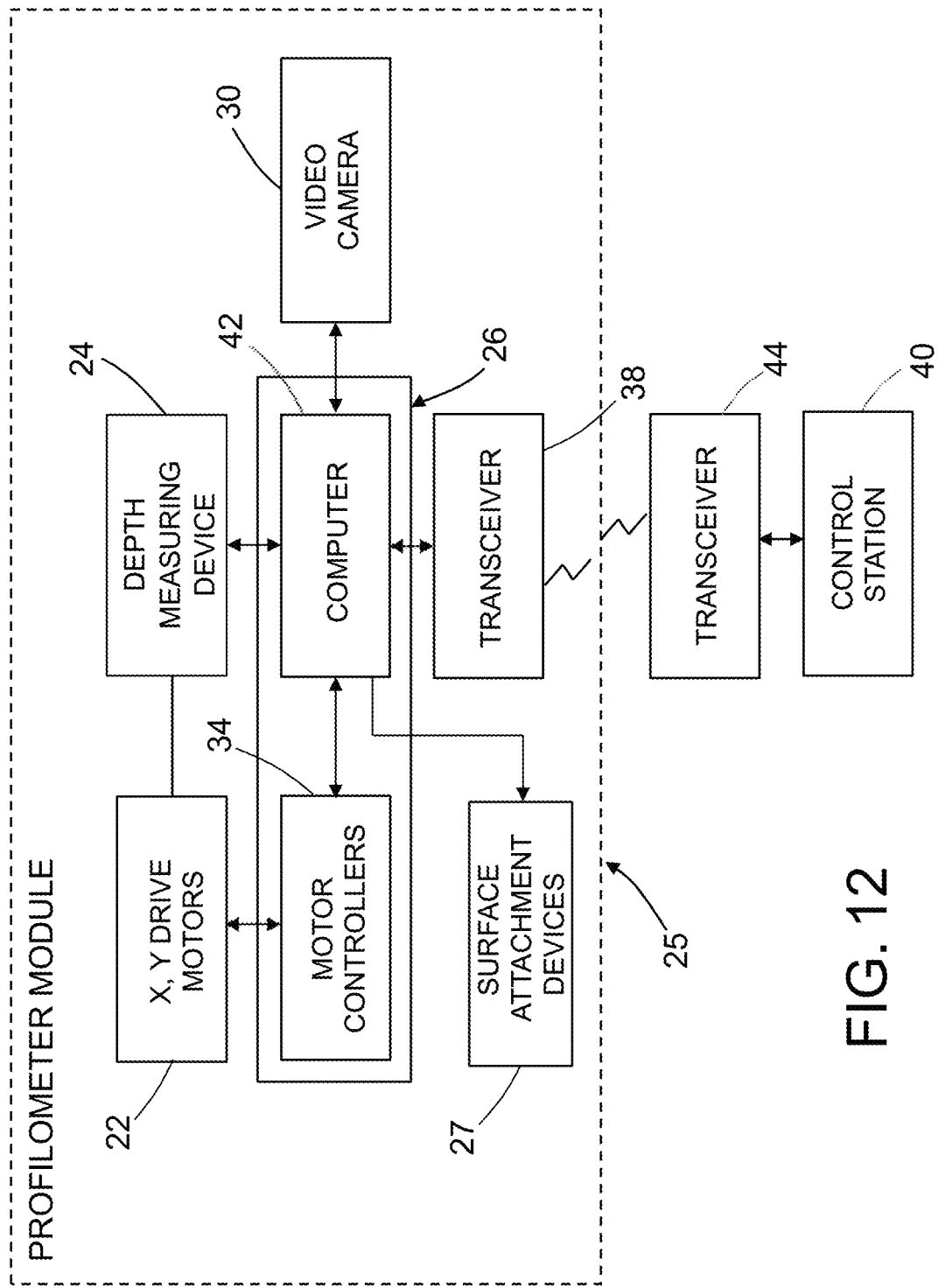
FIG. 12 is a block diagram identifying some components of a profilometer module for remotely controlled measurement of a surface profile in accordance with embodiments in which a depth measurement device is carried by an electro-mechanical 2-D scanner.

FIG. 12 is a block diagram identifying some components of a profilometer module 25 for performing remotely controlled measurement of a surface profile in accordance with embodiments in which a depth measurement device 24 is carried by an electro-mechanical 2-D scanner. Electrical power to all electrically powered components is provided by a battery (not shown). As shown in FIG. 12, the module controller 26 is communicatively coupled to all electrical and electro-mechanical components of the profilometer module 25. The module controller 26 includes a computer 42 and motor controllers 34 which are communicatively coupled to the computer 42. The motor controllers 34 are configured for controlling X and Y drive motors 22 which drive translation of the first and second traveling bridges 20a and 20b identified in FIGS. 6 and 7 or of the traveling bridge 20c and carriage 62 identified in FIG. 9. For example, the computer 42 may be programmed to control operation of the X and Y drive motors 22 so that the depth measurement device 24 travels along a predefined scan path. In addition, the computer 42 controls operation of the depth measurement device 24 and the video camera 30. The previously described surface attachment devices 27 also operate under the control of computer 42.

In the embodiment partly depicted in FIG. 12, X and Y drive motors 22, depth measurement device 24, and video camera 30 are controlled by the computer 42 as a function of radiofrequency commands transmitted by a control station 40 on the ground. Those radiofrequency commands are transmitted by a transceiver 44 on the ground, received by a transceiver 38 incorporated in the profilometer module 25, and converted by the transceiver 38 into the proper digital format. The resulting digital commands are then forwarded to the computer 42. The control station 40 may comprise a general-purpose computer system configured with programming for controlling operation of the profilometer module 25. In addition, the computer system at the control station 40 is configured with programming for processing profile data received from the profilometer module 25 during a depth measurement procedure. In particular, the computer system of the control station 40 may comprise a display processor configured with software for controlling a display monitor (not shown in FIG. 12) to display images acquired by the video camera 30 and profiles acquired by the depth measurement device 24.

In accordance with some embodiments, the respective distances traveled in the X and Y directions are measured using linear encoders (optical or magnetic); in accordance with other embodiments, the respective distances are measured using laser interferometer-based encoders. In one such embodiment, the first component of the linear encoder comprises a reader head and the second component of the linear encoder comprises a series of reference marks spaced at regular intervals along a length of the linear track. The linear encoder may be of the optical or magnetic variety.

More specifically, each linear encoder comprises a first component displaceably coupled to a respective linear track and a second component having a fixed position relative to the linear track. In accordance with one embodiment, the first component of each linear encoder comprises a reflector (e.g., a plane mirror or a retroreflector) and the second component comprises an optical detector head that moves along the linear track. In accordance with another embodiment, the first component of each linear encoder comprises a reader head that moves along the linear track and the second component comprises a series of reference marks spaced at regular intervals along a length of the linear track.

In accordance with the one embodiment, the optical detector head emits a laser beam and the plane mirror reflects the laser beam back to the optical detector head. In accordance with one proposed implementation, optical detector head comprises a laser beam steerer, double-path interferometer optics, and a photodetector for detecting the fringe pattern produced by interference. These components, being well known in the art, are not shown in the drawings.

The photodetector may be of a type that produces four simultaneous real-time outputs representing a sampling of the sinusoidal interference pattern. Following fringe detection, the signals are processed by a combination of pre-amplifiers and differential amplifiers to remove DC offsets, generating sine and cosine signals equal to the phase difference between the outgoing laser beam and incoming laser light reflected by the plane mirror. These analog signals are converted to digital quadrature output pulses. Typically, these digital quadrature pulses are sent to a master counter of a motion controller, a numerical control computer or other motion control processor (not shown in FIG. 12) configured to interpolate the digital quadrature pulses and generate an incremental count indicative of the incremental distance traveled by the optical detector head.

In accordance with an alternative embodiment, each linear encoder may comprise a reader head that moves along a linear track and a measurement tape attached to the linear track and readable by the reader head. The measurement tape comprises a series of optical reference marks spaced at regular intervals along its length. In accordance with one embodiment, the optical reader head is of a well-known incremental type. Such an optical reader head comprises a light source (e.g., an LED) and a photodetector array that detects any reference marks in its field of view at any instant in time. Incremental optical linear encoders typically output two quadrature signals (90 degrees out of phase) which are decoded to produce a count up pulse or a count down pulse. For decoding in software, the two quadrature signals are read by software, either via an interrupt on any edge or polling, and a state diagram lookup table is used to decode the direction of movement of the reader head.

In accordance with alternative embodiments, magnetic linear encoders can be substituted for the optical linear encoders. Such magnetic linear encoders may be of a well-known incremental type. Such magnetic linear encoders comprise a differential magnetoresistive sensor which detects a magnetic signature of a magnetized scale, producing sine and cosine signals as it moves along the scale. These analog signals can then be interpolated internally to produce a range of resolutions.

Figure 13:
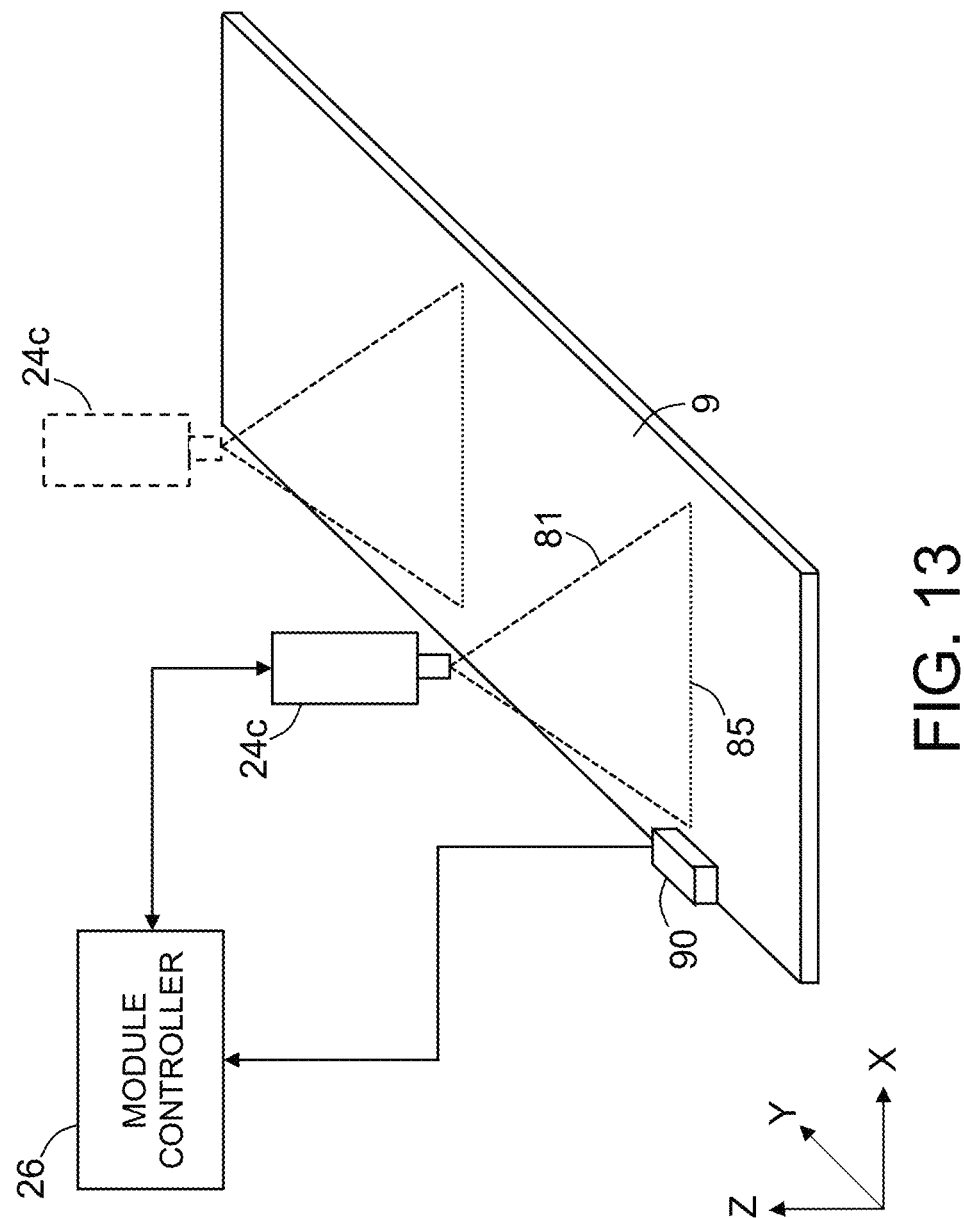
FIG. 13 is a diagram showing a three-dimensional view of a line laser profiler at different positions for acquiring surface profile measurement data from a surface area. The line laser profiler may be mounted to a motorized scanning traveling bridge that may be translated across the surface along one axis.

FIG. 13 is a diagram showing a three-dimensional view of a line laser profiler 24c at different positions for acquiring surface profile measurement data from an area on a surface 9. The line laser profiler 24c may be mounted to the center of a motorized scanning traveling bridge (not shown in FIG. 13) which spans the opening in base 14a of module frame 14 and is translatable in the Y directions. The line laser profiler 24c is drawn in solid lines to indicate its current position; the line laser profiler 24c is drawn in dashed lines to indicate a previous position. At each position, the line laser profiler 24c generates a curtain 81 of successive laser beams which optically scan the surface 9 along a line of laser spots 83 (indicated by dotted lines in FIG. 13). Thus, the line laser profiler 24c may be mechanically scanned in the Y direction by moving the traveling bridge, while the line laser profiler itself is capable of optically scanning the surface 9 in the X direction by emitting a curtain 85 of laser beams in succession and receiving returned laser light.

While being very precise, a line laser profiler only provides a linear depth profile rather than depth profiles of areas. In other words, a linear laser profiler scans only a line (or a very narrow area that can be viewed as a line) on the surface of a structure. This output may be referred to as a linear depth profile and may be presented as a plot of depth values along a scan line. Overall, the proposed method and system depicted in FIG. 13 may utilize a line laser profiler 24c in conjunction with positional encoders to identify positions of the profiler each time the line laser profiler 24c acquires a new linear depth profile. The linear depth profiles may be aggregated into a 3-D surface representation (e.g., a depth map), which also takes into account the profiler's positions for each linear depth profile. The depth data may be displayed as an image corresponding to the surface (e.g., different depth ranges shown with different colors/grayscales).

The surface profile measurement system depicted in FIG. 13 includes a line laser profiler 24c, an encoder 90, and a module controller 26. The encoder 90 may be configured and used to determine the current profiler position and provide reference for the current linear depth profiles acquired at that position. For example, as line laser profiler 24c acquires data representing a current linear depth profile and transmits this profile data to the module controller 26, the encoder 90 determines the current position of line laser profiler 24c and also sends that information to computer 42 of the module controller 26. This set of operations may be repeated for each new position and linear depth profile corresponding to that position.

In accordance with a fourth embodiment, the profilometer comprises a 3-D laser scanner which is fixedly coupled to the center of a stationary beam that spans the opening in the base 14a of the module frame 14. For example, the 3-D laser scanner may be configured for three-dimensionally measuring the profile of surface and is capable of measuring position information of a large number of measurement points in a three-dimensional space by using the principle of triangulation, and of acquiring profile data representing the three-dimensional profile of the surface. For example, stripe-patterned light may be projected on the surface and an image of the surface is captured by a camera in this state. Depth information for the surface is determined by analyzing captured images, based on the shift between patterns and the level of distortion. More specifically, structured light is emitted from a laser and projected onto the surface being profiled. The reflected light is then detected and will appear banded and bent based on changes in the topography of the surface. Triangulation is then used to calculate and measure the depth of the surface.

Figure 14:
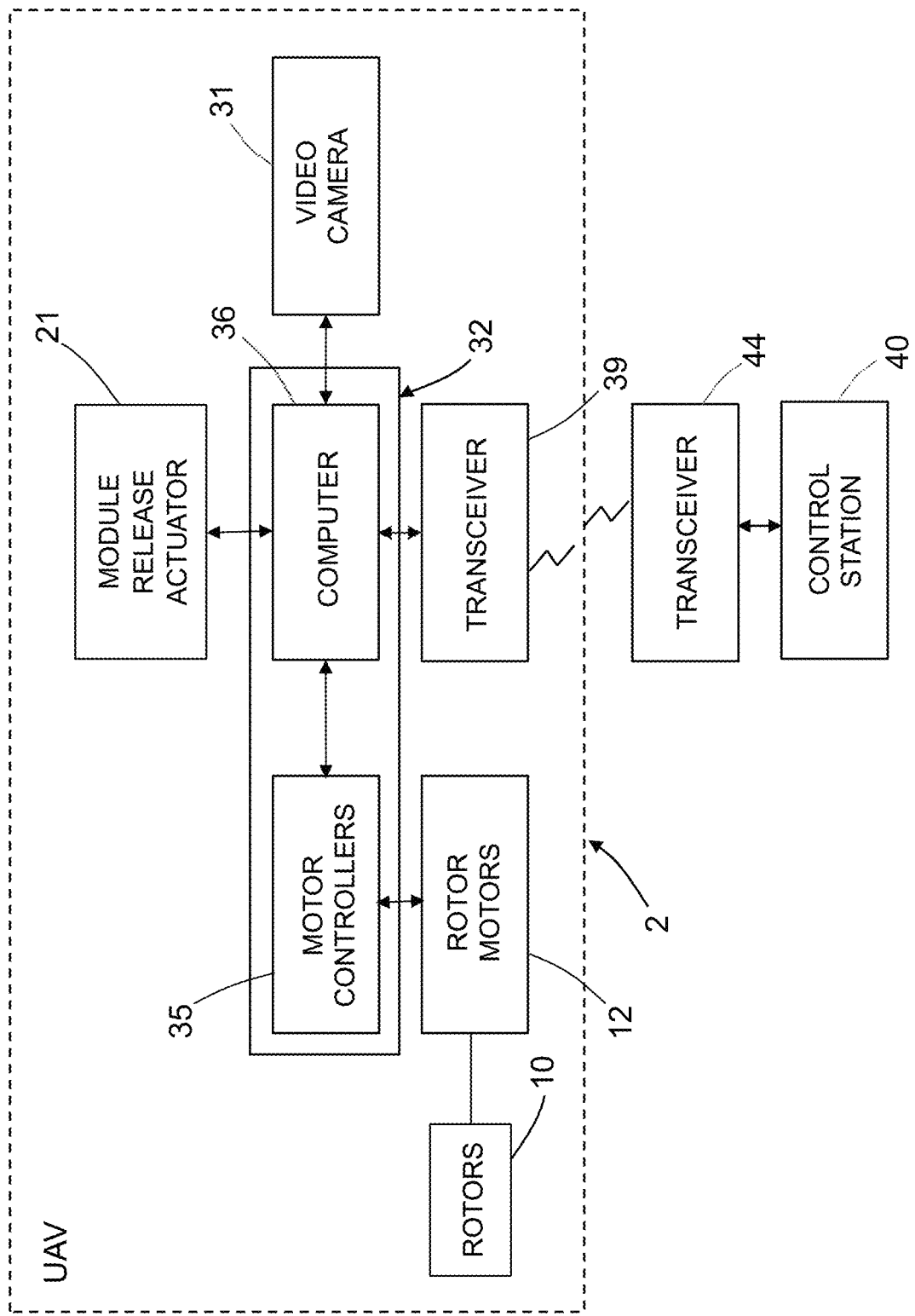
FIG. 14 is a block diagram identifying some components of an unmanned aerial vehicle configured to carry a module.

FIG. 14 is a block diagram identifying some components of a UAV 2 configured to carry a module (not shown). The flight of the UAV 2 is controlled by a flight controller 32 that includes a computer 36 and a plurality of motor controllers 35. The computer 36 controls the flight of the UAV 2 by sending commands to the motor controllers 35 which respectively control the rotation of respective rotor motors 12 that drive rotation of rotors 10. In accordance with one flight mode, the computer 36 is configured to control the flight of the UAV 2 as a function of radiofrequency commands transmitted by a transceiver 44. Those radiofrequency commands are received by a transceiver 39 on-board the UAV 2, converted into the proper digital format, and then forwarded to a computer 36 of the flight controller 32. The UAV 2 includes a video camera 31 (which may be mounted to a pan-tilt mechanism not shown in FIG. 14) that provides images for use in flight control. For example, as the UAV 2 approaches the surface area of interest on a limited-access structure, the video camera 31 may capture images of the area of interest to assist in controlling the UAV 2 so that it lands on the surface at a position where the profilometer may acquire profile data from area of interest.

The UAV 2 is also equipped with a coupling mechanism (such as coupling mechanism 15 depicted in FIG. 3D) which is configured to couple a profilometer module (not shown in FIG. 14) to the UAV 2 and hold the module securely during flight. The UAV 2 is further equipped with a module release actuator 21 that that actuates the coupling mechanism 15 to de-couple from the profilometer module.

The control station 40 may comprise a general-purpose computer system configured with programming for controlling operation of the UAV 2 and operation of the profilometer module. For example, the pan and tilt angles of the pan-tilt mechanism, and therefore the orientation of the video camera 31, can be controlled using the keyboard, mouse, touchpad, or touchscreen of the computer system at the control station 40 or other user interface hardware (e.g., a gamepad). In addition, the computer system at the control station 40 is configured with programming for processing profile data received from the profilometer module during a measurement procedure. In particular, the computer system of the control station 40 may comprise a display processor configured with software for controlling a display monitor (not shown in FIG. 14) to display video images of the surface and images of one or more profiles of the surface. The optical image field, as sighted by the video camera 31, can be displayed in one window on the display monitor, while the profiles are imaged in another window.

Figure 15:
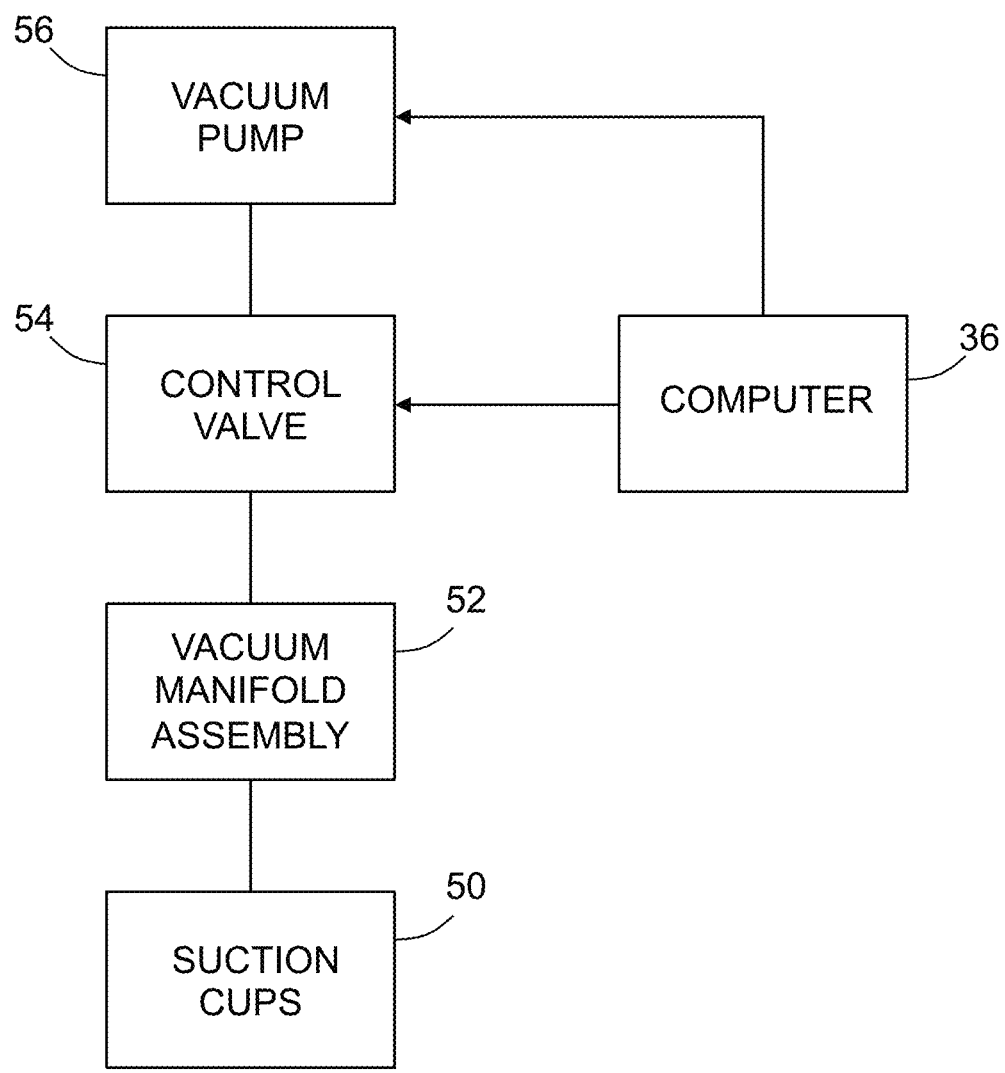
FIG. 15 is a block diagram identifying some components of a system for holding a profilometer module in a stable position on a surface of a structure using suction cups.

FIG. 15 is a block diagram identifying some components of a system for holding (temporarily attaching) a profilometer module in a stable position on a surface of a structure using a vacuum adherence system. The vacuum adherence system includes plurality of suction cups 50, a vacuum manifold assembly 52, an electro-mechanical (e.g., solenoid-actuated) control valve 54 (hereinafter "control valve 54"), and a vacuum pump 56. The vacuum pump 56 is in fluid communication with a first port of control valve 54; the vacuum manifold assembly 52 is in fluid communication with a second port of control valve 54. The plurality of suction cups 50 are in fluid communication with the vacuum manifold assembly 52. The term "manifold" is used herein in the sense of a chamber or duct having several outlets through which a fluid can be distributed or gathered. These manifolds connect channels in the suction cups 50 to the vacuum system comprising vacuum pump 56 and control valve 54. In accordance with alternative embodiments, each individual suction cup 50 has a respective vacuum motor (not shown).

The computer 42 (previously described with reference to FIG. 12) is further configured to control the state of control valve 54, which selectively connects vacuum pump 56 to vacuum manifold assembly 52. The vacuum manifold assembly 52 comprises a plurality of vacuum manifolds which are in fluid communication with respective suction cups 50. The computer 42 may be programmed to send a control signal that causes the control valve 54 to open. In the valve open state, the computer 42 also sends a control signal to activate the vacuum pump 56. The vacuum pump 56 applies a vacuum pressure to the vacuum manifold assembly 52 that causes the suction cups 50 to vacuum adhere to the surface being measured. The vacuum pump 56 should maintain constant vacuum pressure. In accordance with one proposed implementation, the vacuum pump 56 does not operate continuously; instead the vacuum pump 56 continuously monitors the vacuum pressure under the suction cups 50 and activates every time the vacuum pressure falls below a specified threshold. The system will attempt to maintain a pressure differential of about 1 to 2 psi below atmospheric pressure.

Figure 16:
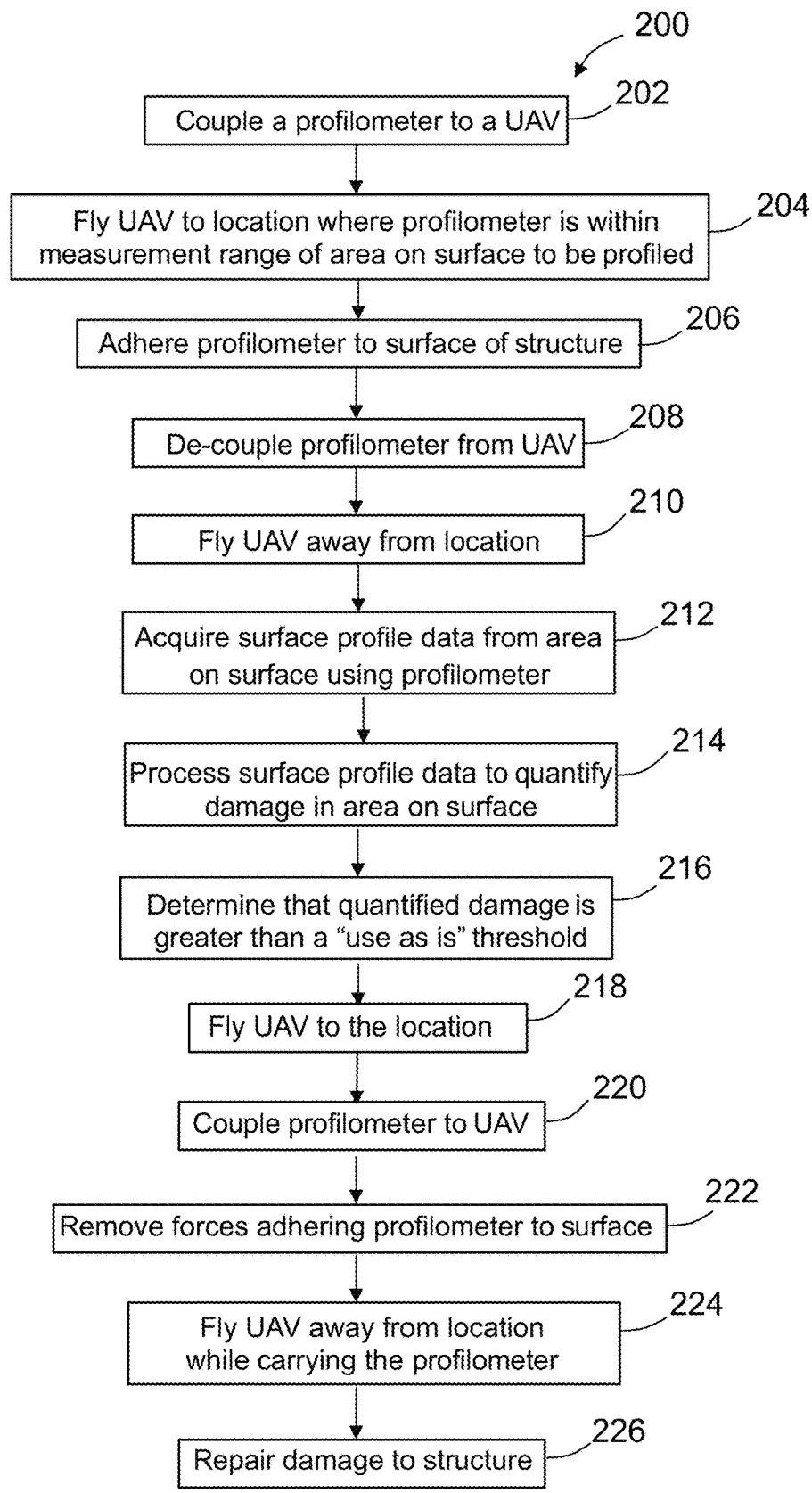
FIG. 16 is a flowchart identifying steps of a method for measuring a profile of a surface of a limited-access structure using a UAV in accordance with one embodiment.

FIG. 16 is a flowchart identifying steps of a method 200 for measuring a profile of a surface of a limited-access structure using a UAV in accordance with one embodiment. An early step in the method 200 involves coupling a profilometer module to a UAV at a maintenance facility (step 202). The unmanned aerial vehicle then takes off and flies to a location where the profilometer is within measurement range of an area to be profiled on the surface of a structure (step 204). The profilometer module is adhered to the surface of the structure (step 206) and de-coupled from the UAV (step 208). Then the UAV takes off from the surface and flies away from the location (step 210). The profilometer module remains on the surface and is used to acquire surface profile data from the area to be profiled (step 212). The surface profile data is processed to quantify a dimension of an anomalous area that was profiled (step 214). In some cases, a determination is made that the quantified discrepancy is greater than a "use as is" threshold (step 216). This determination completes the measurement procedure, which will be followed by a repair procedure. The UAV is flown back to the location and aligned with the profilometer module (step 218). Then the profilometer module is coupled to the UAV (step 220). After the profilometer module has been securely coupled to the UAV, the forces adhering the profilometer to the surface are removed (step 222). Then the UAV takes off again and flies away from location while carrying the profilometer module. The structure is then repaired using a repair tool which is mounted to the same or a different UAV (step 226).

In accordance with some embodiments, the UAV-enabled surface profile measurement system proposed herein also includes an off-board tracking system for vehicle and profilometer localization, which system may be communicatively coupled to the aforementioned control station 40 on the ground. More specifically, the off-board tracking system is configured to provide three-dimensional (3-D) localization information for navigation and control of the UAV 2 relative to the target object and for accurately locating the profilometer module in the frame of reference of the target object and correlating the location data with a 3-D model of the target object. Accurate location tracking for UAV-based measurement will enable the UAV 2 to move a profilometer module to the proper location and record the 3-D coordinate data associated with that location. This 3-D information is important for documenting the measurements, as well as enabling accounting for the results of a previously performed UAV-enabled inspection. Any one of various techniques may be used to provide the information for recording the 3-D location of the activity.

In accordance with one embodiment, the UAV includes an onboard tracking system that is able to navigate the UAV in accordance with a preprogrammed flight plan. The preprogrammed flight plan carried by UAV enables the UAV to follow a flight path around a portion of the target object. The system further includes an off-board tracking system having means for wireless communication with the UAV. The off-board tracking system is configured to send commands to or monitor various operating performance parameters of the UAV, such as fuel remaining, battery power remaining, etc. The off-board tracking system may also be used generate commands to alter the flight path of the UAV based on acquired localization data.

In accordance with some embodiments, the UAV-enabled measurement system proposed herein also includes three-dimensional (3-D) localization for navigation and control of the UAV 2 relative to the target object. Accurate location tracking for UAV-based repair will enable the system to move to the proper location. Any one of various techniques may be used to provide the information for recording the 3-D location of the activity.

In accordance with one embodiment, 3-D localization may be accomplished by placing optical targets (such as retro-reflective targets) on the UAV 2 and then using motion capture feedback control to calculate the location of the UAV 2. Closed-loop feedback control using motion capture systems is disclosed in detail in U.S. Pat. No. 7,643,893, the disclosure of which is incorporated by reference herein in its entirety. In accordance with one embodiment, the motion capture system is configured to measure one or more motion characteristics of the UAV 2 during a repair mission. A processor receives the measured motion characteristics from the motion capture system and determines a control signal based on the measured motion characteristics. A position control system receives the control signal and continuously adjusts at least one motion characteristic of the UAV 2 in order to maintain or achieve a desired motion state. The UAV 2 may be equipped with optical targets in the form of passive retro-reflective markers. The motion capture system, the processor, and the position control system comprise a complete closed-loop feedback control system.

In accordance with an alternative embodiment, location tracking of the UAV 2 may be implemented using a local positioning system (not shown in the drawings) mounted on or near the target object. The local positioning system may be controlled from the ground and used to track the location of a UAV 2 having three or more known visible features thereon. A typical local positioning system comprises: a pan-tilt mechanism; a camera mounted to the pan-tilt mechanism; and a laser range meter for projecting a laser beam along an aim direction vector onto each visible features. The pan-tilt mechanism comprises a pan unit and a tilt unit. The camera comprises a housing to which the laser range meter is mounted. The camera may comprise a still camera (color and/or black and white) to obtain still images, a video camera to obtain color and/or black and white video, or an infrared camera to obtain infrared still images or infrared video of the visible features. The local positioning system further comprises a computer system which is configured to measure coordinates of the visible features in the local coordinate system of the target object. In particular, this computer system is programmed to control motions of the pan-tilt mechanism to rotationally adjust the camera to selected angles around the vertical, azimuth (pan) axis and the horizontal, elevation (tilt) axis. The computer system is also programmed to control operation of the camera and receive image data therefrom for transmission to the control station 40. The computer system is further programmed to control operation of the laser range meter and receive range data therefrom for transmission to the control station 40. The local positioning system may further comprise a wireless transceiver and an antenna to enable bidirectional, wireless electromagnetic wave communications with a control station. The local positioning system preferably has the capabilities described in U.S. Pat. Nos. 7,859,655, 9,285,296, and 8,447,805 and U.S. Patent Application Pub. No. 2018/0120196, the disclosures of which are incorporated by reference herein in their entireties. The image data acquired by the video camera of the local positioning system may undergo image processing as disclosed in U.S. Pat. No. 8,744,133.

An alternative 3-D localization approach involves placing two or more UAV-placed visible targets, such as ink marks, adjacent to the repair area. The marks would be used by the UAV to accurately re-orient itself to the repair during each successive repair operation. Automated video localization equipment would be employed to re-orient the UAV to the repair area using the usable marks.

While methods and apparatus for UAV-enabled automated measurement of the profile of a surface of a limited-access structure have been described with reference to various embodiments, it will be understood by those skilled in the art that various changes may be made and equivalents may be substituted for elements thereof without departing from the scope of the teachings herein. In addition, many modifications may be made to adapt the teachings herein to a particular situation without departing from the scope thereof. Therefore it is intended that the claims not be limited to the particular embodiments disclosed herein.

As used in the claims, the term "controller" should be construed broadly to encompass a system having at least one computer or processor, and which may have multiple computers or processors that communicate through a network or bus. As used in the preceding sentence, the terms "computer" and "processor" both refer to devices having a processing unit (e.g., a central processing unit) and some form of memory (i.e., computer-readable medium) for storing a program which is readable by the processing unit. For example, the term "controller" includes, but is not limited to, a small computer on an integrated circuit containing a processor core, memory and programmable input/output peripherals.

As used herein, the phrase "fixedly coupled to" as applied to two parts means that one of the parts is either affixed to or integrally formed with the other part. As used herein, the term "affixed" should be construed broadly to encompass all of the following types of fixation: welding, adhesive bonding, and fastening.

As should be apparent from the preceding disclosure, the structures corresponding to the "depth measurement device" recited in the appended claims include a contact displacement sensor (e.g., a pin micrometer), a laser range meter, and structural equivalents thereof. The above-disclosed structures corresponding to the "profilometer" recited in the appended claims include: a point depth measurement device mounted to a 2-D scanner; a line laser profiler mounted to a 1-D scanner; a 3-D laser scanner mounted to a frame; and structural equivalents thereof.

The invention claimed is:

1. An apparatus comprising:
   a first frame;
   a plurality of rotor motors mounted to the first frame;
   a plurality of rotors operatively coupled to respective rotor motors of the plurality of rotor motors and configured to generate sufficient aerodynamic lift force to support a weight of the apparatus;
   a second frame coupled to the first frame;
   a plurality of attachment feet coupled to the second frame;
   a scanner translatably coupled to the second frame;
   a depth measurement device supported by the scanner and configured to measure a depth of a target point on a surface of a structure or object when the plurality of attachment feet are in contact with the surface; and
   a computer programmed to control the rotors to generate the sufficient aerodynamic lift force during flight and to control the scanner and the depth measurement device so that the depth measurement device acquires depth data from the surface at multiple positions along a scan path in a plane after landing on a target object, wherein the scanner comprises:

a first traveling bridge slidably coupled to the second frame for translation in an X direction and having a first longitudinal slot; and a second traveling bridge slidably coupled to the second frame for translation in a Y direction perpendicular to the X direction and having a second longitudinal slot that crosses the first longitudinal slot, and wherein the depth measurement device is supported at a crossing of the first and second longitudinal slots.

2. The apparatus as recited in claim 1, further comprising:

a first motor operatively coupled to drive translation of the first traveling bridge in the X direction; and a second motor operatively coupled to drive translation of the second traveling bridge in the Y direction, wherein the computer is programmed to control operation of the first and second motors so that the depth measurement device travels along the scan path.

3. The apparatus as recited in claim 1, wherein the depth measurement device is a contact displacement sensor.

4. The apparatus as recited in claim 1, further comprising a module release actuator configured to release the second frame from the first frame in response to receipt of an activation signal.

5. The apparatus as recited in claim 1, wherein the depth measurement device is a laser range meter.

6. A depth measurement apparatus comprising:

a frame;

a plurality of attachment feet coupled to the frame;

a scanner comprising a first traveling bridge slidably coupled to the frame for translation in an X direction and having a first longitudinal slot, and a second traveling bridge slidably coupled to the frame for translation in a Y direction perpendicular to the X direction and having a second longitudinal slot that crosses the first longitudinal slot, and a depth measurement device fixedly coupled to the scanner, wherein the depth measurement device is supported at a crossing of the first and second longitudinal slots and is configured to measure a depth of a point on a surface of a structure or object when the plurality of attachment feet are in contact with the surface.

7. The apparatus as recited in claim 6, further comprising a computer programmed to control the scanner and the depth measurement device so that the depth measurement device acquires profile data from the surface at multiple positions along a two-dimensional scan path.

8. The apparatus as recited in claim 7, further comprising:

a first motor operatively coupled to drive translation of the first traveling bridge in the X direction; and a second motor operatively coupled to drive translation of the second traveling bridge in the Y direction, wherein the computer is programmed to control operation of the first and second motors so that the depth measurement device travels along the scan path.

9. The apparatus as recited in claim 6, wherein the depth measurement device is a contact displacement sensor.

10. The apparatus as recited in claim 6, wherein the depth measurement device is a laser range meter.

11. The apparatus as recited in claim 6, wherein the scanner further comprises a device holder that supports the depth measurement device at the crossing of the first and second longitudinal slots, and wherein the device holder has a first portion that is coupled to the first longitudinal slot in a manner that enables the depth measurement device to translate in the X direction and a second portion that is coupled to longitudinal slot in a manner that enables the depth measurement device to translate in a Y direction.

12. The apparatus as recited in claim 11, wherein the device holder has one annular projection which slides in respective linear grooves formed in the sides of the first longitudinal slot and another annular projection which slides in respective linear grooves formed in the sides of the second longitudinal slot.

13. An apparatus comprising:

a frame;

a plurality of rotor motors mounted to the frame;

a plurality of rotors operatively coupled to respective rotor motors of the plurality of rotor motors and configured to generate sufficient aerodynamic lift force to support a weight of the apparatus;

a plurality of attachment feet; and a profilometer mounted to the frame and configured to measure a profile of a surface of a structure or object when the plurality of attachment feet are in contact with the surface, wherein the profilometer comprises:

a first traveling bridge slidably coupled to the frame for translation in an X direction and having a first longitudinal slot;

a second traveling bridge slidably coupled to the frame for translation in a Y direction perpendicular to the X direction and having a second longitudinal slot that crosses the first longitudinal slot; and a depth measurement device supported at a crossing of the first and second longitudinal slots.

14. The apparatus as recited in claim 13, wherein the depth measurement device comprises a contact displacement sensor.

15. The apparatus as recited in claim 13, wherein the depth measurement device comprises a laser range meter.

16. The apparatus as recited in claim 13, further comprising a flight controller that is configured to control the rotors to cause the apparatus to fly along a flight path to a location where the profilometer confronts an area on the surface of a structure to be measured.

17. An apparatus comprising:

a first frame;

a plurality of rotor motors mounted to the first frame;

a plurality of rotors operatively coupled to respective rotor motors of the plurality of rotor motors and configured to generate sufficient aerodynamic lift force to support a weight of the apparatus;

a second frame coupled to the first frame;

a plurality of attachment feet coupled to the second frame;

a scanner translatably coupled to the second frame;

a non-destructive inspection sensor unit supported by the scanner and configured to acquire non-destructive inspection sensor data from a target object when the plurality of attachment feet are in contact with a surface of the target object; and a computer programmed to control the rotors to generate the sufficient aerodynamic lift force during flight and to control the scanner and the non-destructive inspection sensor unit so that the non-destructive inspection sensor unit acquires non-destructive inspection sensor data from the target object along a scan path in a plane after landing on the target object, wherein the scanner comprises:

a first traveling bridge slidably coupled to the second frame for translation in an X direction and having a first longitudinal slot; and a second traveling bridge slidably coupled to the second frame for translation in a Y direction perpendicular to the X direction and having a second longitudinal slot that crosses the first longitudinal slot, and wherein the non-destructive inspection sensor unit is supported at a crossing of the first and second longitudinal slots.

18. The apparatus as recited in claim 17, wherein the non-destructive inspection sensor unit is a depth measurement device.

19. The apparatus as recited in claim 17, wherein the scanner further comprises a device holder that supports the non-destructive inspection sensor unit at the crossing of the first and second longitudinal slots, and wherein the device holder has a first portion that is coupled to the first longitudinal slot in a manner that enables the depth measurement device to translate in the X direction and a second portion that is coupled to longitudinal slot in a manner that enables the depth measurement device to translate in a Y direction.

20. The apparatus as recited in claim 19, wherein the device holder has one annular projection which slides in respective linear grooves formed in the sides of the first longitudinal slot and another annular projection which slides in respective linear grooves formed in the sides of the second longitudinal slot.

* * * * *